(12) United States Patent
Footer et al.

(10) Patent No.: US 12,017,966 B2
(45) Date of Patent: Jun. 25, 2024

(54) PRODUCT, SYSTEM AND METHOD FOR AN IMPROVED FERTILIZER

(71) Applicant: FOOP Organic Biosciences, Inc., Silver Spring, MD (US)

(72) Inventors: Laurence J. Footer, Washington, DC (US); Jonathan V. Goslin, Falls Church, VA (US)

(73) Assignee: FOOP ORGANIC BIOSCIENCES, INC., Silver Spring, MD (US)

( * ) Notice: Subject to any disclaimer, the term of this patent is extended or adjusted under 35 U.S.C. 154(b) by 0 days.

(21) Appl. No.: 16/727,907

(22) Filed: Dec. 26, 2019

(65) Prior Publication Data

US 2020/0207674 A1    Jul. 2, 2020

Related U.S. Application Data

(60) Provisional application No. 62/785,021, filed on Dec. 26, 2018.

(51) Int. Cl.
*C05F 1/00* (2006.01)
*C05F 11/00* (2006.01)
*C05G 3/60* (2020.01)

(52) U.S. Cl.
CPC ............. *C05F 1/002* (2013.01); *C05F 11/00* (2013.01); *C05G 3/60* (2020.02)

(58) Field of Classification Search
CPC ............. C05F 11/00; C05F 1/002; C05G 3/60
See application file for complete search history.

(56) References Cited

U.S. PATENT DOCUMENTS

| | | | |
|---|---|---|---|
| 5,634,959 A * | 6/1997 | Beaty | C05F 1/002 71/16 |
| 6,083,293 A | 7/2000 | Bath | |
| 6,443,097 B1 | 9/2002 | Zohar et al. | |
| 7,258,790 B2 | 8/2007 | Brune et al. | |
| 7,820,225 B2 | 10/2010 | Zuniga | |
| 9,259,663 B2 | 2/2016 | Ghosh et al. | |
| 9,604,887 B2 | 3/2017 | Evans | |
| 2002/0053229 A1* | 5/2002 | Varshovi | C05G 1/00 71/6 |
| 2002/0187552 A1* | 12/2002 | Cheung | A01N 63/32 435/446 |
| 2004/0177664 A1* | 9/2004 | Hale | C05C 3/00 71/11 |
| 2007/0012078 A1 | 1/2007 | Holms et al. | |
| 2010/0021515 A1* | 1/2010 | Duponnois | A01N 63/30 47/58.1 SC |
| 2010/0175441 A1 | 7/2010 | Lee et al. | |
| 2011/0041395 A1 | 2/2011 | Newbold et al. | |
| 2011/0247378 A1 | 10/2011 | Begley et al. | |
| 2014/0346125 A1* | 11/2014 | Stiles, Jr. | C02F 11/121 210/768 |
| 2015/0144069 A1 | 5/2015 | Dickerson et al. | |

FOREIGN PATENT DOCUMENTS

| | | | |
|---|---|---|---|
| CA | 3004215 A1 | | 11/2018 |
| CN | 103508773 | | 1/2014 |
| CN | 204644062 | | 9/2015 |
| CN | 107721771 | | 2/2018 |
| CN | 108117434 | * | 6/2018 |
| IN | 105000761 | | 10/2015 |
| WO | 2016/035090 A1 | | 3/2016 |

OTHER PUBLICATIONS

Dakora et al. (Silicon nutrition promotes root growth and tissue mechanical strength in symbiotic cowpea, Functional Plant Biology, 2003,30,947-953) (Year: 2003).*
International Search Report and Written Opinion dated May 5, 2020, directed to International Application No. PCT/US19/68633; 15 pages.
Invitation to Pay Additional Fees dated Mar. 9, 2020, directed to International Application No. PCT/US19/68633; 2 pages.
FOOP Aquaponics in a Bottle (2019). "FOOP Helps Hemp Farm Rescue 6,000 Nitrogen Deficient Plants," Case Study: 1 page.
FOOP Aquaponics in a Bottle (2019). "Medicinal Cannabis Cultivator Increases Yield by 20% Using FOOP," Case Study: 1 page.
Partial Supplemental European Search Report dated Nov. 10, 2022, directed to European Application No. 19916300.7; 14 pages.
Zhou et al., "The Nutrients in the Fertile Water from Fish Pond Assimilated and Utilized by Paddy Field," 2011 International Symposium on Water Resource and Environmental Protection, 2695-2698 (2011).
Database WPI Week 201739 Thomson Scientific, London, GB; AN 2017-33512E & CN 106 630 385 A (Cafs Yangtze River Fisheries Res Inst) (May 10, 2017).
Database WPI Week 201802 Thomson Scientific, London, GB; AN 2017-81743C & CN 107 381 829 A (Anhui Huanghuai Veterinary Drug Co Ltd) (Nov. 24, 2017).

* cited by examiner

*Primary Examiner* — Michael G. Hartley
*Assistant Examiner* — Danielle Johnson
(74) *Attorney, Agent, or Firm* — Troutman Pepper Hamilton Sanders LLP (Rochester)

(57) ABSTRACT

A product, system and method for an improved plant fertilizer made from harvested skimmate from a reservoir filed with a reduced sodium, artificial ocean water solution and live fish that produce fish excrement (reclaimed as skimmate). The skimmate contains a reduced concentration of sodium as a result of being harvested from a reduced sodium aquatic solution. The harvested skimmate is mixed with one or more additives to produce an improved fertilizer that may be certified as organic.

16 Claims, 11 Drawing Sheets

| Macro-Elements | | | |
|---|---|---|---|
| Element | Reduced sodium Artificial Ocean Water | Natural Ocean Water | Deviation |
| Na | 94.00 mg/L | 10700.00 mg/L | -10606.00 |
| Ca | 813.00 mg/L | 440.00 mg/L | 373.00 |
| Mg | 1937.00 mg/L | 1370.00 mg/L | 567.00 |
| K | 360.00 mg/L | 400.00 mg/L | -40.00 |
| Br | 58.00 mg/L | 62.00 mg/L | -4.00 |
| B | 2.95 mg/L | 4.50 mg/L | -1.55 |
| Sr | 8.47 mg/L | 8.00 mg/L | 0.47 |
| S | 3127.00 mg/L | 900.00 mg/L | 2227.00 |

FIG. 3

| Li-Group | | | |
|---|---|---|---|
| Element | Reduced sodium Artificial Ocean Water | Natural Ocean Water | Deviation |
| Li | 469.00 µg/L | 200.00 µg/L | 269.00 |
| Ni | 0.00 µg/L | 5.00 µg/L | -5.00 |
| Mo | 14.00 µg/L | 12.00 µg/L | 2.00 |

FIG. 4

| I-Group | | | |
|---|---|---|---|
| Element | Reduced sodium Artificial Ocean Water | Natural Ocean Water | Deviation |
| V | 0.00 µg/L | 1.20 µg/L | -1.20 |
| Zn | 12.00 µg/L | 4.00 µg/L | 8.00 |
| Mn | 1.24 µg/L | 2.00 µg/L | -0.76 |
| I | 787.00 µg/L | 60.00 µg/L | 727.00 |

FIG. 5

| Fe-Group | | | |
|---|---|---|---|
| Element | Reduced sodium Artificial Ocean Water | Natural Ocean Water | Deviation |
| Cr | 0.00 µg/L | 0 µg/L | -0.10 |
| Co | 0.00 µg/l | 0 µg/l | -0.10 |
| Fe | 0.00 µg/l | 0 µg/l | -0.10 |

FIG. 6

| Ba-Group | | | |
|---|---|---|---|
| Element | Reduced sodium, Artificial Ocean Water | Natural Ocean Water | Deviation |
| Ba | 33.00 µg/L | 10.00 µg/L | 23.00 |
| Be | 0.00 µg/L | 0 µg/L | -0.10 |

FIG. 7

| Si-Group | | | |
|---|---|---|---|
| Element | Reduced sodium, Artificial Ocean Water | Natural Ocean Water | Deviation |
| Si | 1046.00 µg/L | 100.00 µg/L | 946.00 |

FIG. 8

| Nutrient-Group | | | |
|---|---|---|---|
| Element | Reduced sodium, Artificial Ocean Water | Natural Ocean Water | Deviation |
| P | 926.00 µg/L | 6.00 µg/L | 920.00 |
| PO4 | 2.834 mg/L | 0.018 mg/L | 2.816 |

FIG. 9

| Unwanted heavy metals | | | |
|---|---|---|---|
| Element | Reduced sodium, Artificial Ocean Water | Natural Ocean Water | Deviation |
| Hg | 0.00 µg/L | 0 µg/L | -0.10 |
| Se | 11.00 µg/L | 0 µg/L | 10.9.10 |
| Cd | 0.00 µg/L | 0 µg/L | -0.10 |
| Sn | 3.40 µg/L | 0 µg/L | 3.30 |
| Sb | 0.00 µg/L | 0 µg/L | -0.10 |
| As | 0.00 µg/L | 0 µg/L | -0.10 |
| Al | 18.00 µg/L | 2.00 µg/L | 16.00 |
| Pb | 0.00 µg/L | 0 µg/L | -0.10 |
| Ti | 0.00 µg/L | 0 µg/L | -0.10 |
| Cu | 0.00 µg/L | 0 µg/L | -0.10 |
| La | 0.00 µg/L | 0 µg/L | -0.10 |
| Sc | 0.00 µg/L | 0 µg/L | -0.10 |
| W | 0.00 µg/L | 0 µg/L | -0.10 |

FIG. 10

FOOP provides a line of all-natural nutrients made primarily from reclaimed fish poop that delivers everything high-yielding cannabis and hemp plants need to flourish in a simple two-part solution.

No additives are required because FOOP delivers all the base nutrients that plants require – from the NPK to the Cal-Mag, Silica and other critical micronutrients and minerals. It even delivers both a rich living biome of beneficial bacteria to the roots of plants that accelerates the uptake of nutrients as well as enzymes to promote root health and prevent mineral buildup on roots.

DIRECTIONS:
- Shake each bottle well before each use.
- Store in a cool, dark location.
- For plants in the vegetative stage, mix an equal part of FOOP Veg 1 and FOOP Veg 2 with water every time you feed per the schedule below.
- For plants in the flowering stage, mix an equal part of FOOP Bloom 1 and FOOP Bloom 2 plus the FOOP Sweetener with water every time you feed per the schedule below.

IMPORTANT TIPS:
- FOOP is different. We understand that you might be tempted to reduce the feedings because it feels like too much food, but it's not. We guarantee that these feeds will not burn your plants.
- Do not mix the contents of any FOOP product with any other FOOP product outside of a reservoir or watering can.
- Adjust pH to 6.0-6.4 if necessary.
- For best results, use reverse osmosis/ deionized water for every feed.

FOR SMALLER PLANTS: (A Shorter Vegetative Stage) All measurements are in ml/gallon

| Seedling | PPM | Veg 1 | Veg 2 |
|---|---|---|---|
| Week 1 | 150 | 5 | 5 |
| Week 2 | 300 | 10 | 10 |

| Veg | PPM | Veg 1 | Veg 2 |
|---|---|---|---|
| Week 1 | 500 | 18 | 18 |
| Week 2 | 700 | 26 | 26 |

| Bloom | PPM | Bloom 1 | Bloom 2 | Sweetener |
|---|---|---|---|---|
| Week 1 | 900 | 24 | 24 | 0 |
| Week 2 | 1100 | 30 | 30 | 0 |
| Week 3 | 1300 | 36 | 36 | 0 |
| Week 4 | 1300 | 35 | 35 | 15 |
| Week 5 | 1300 | 34 | 34 | 22 |
| Week 6 | 1300 | 33 | 33 | 27 |
| Week 7 | 1300 | 31 | 31 | 40 |
| Week 8* | 900 | 24 | 24 | 31 |
| Week 9* | 700 | 16 | 16 | 21 |
| Week 10* | 500 | 11 | 11 | 15 |

*Ramp down the feed per this schedule or however you deem appropriate for your flush. Adjust per strain as necessary. This schedule was designed for a 10 week flowering cycle. Strains with 8 week flowering cycles should begin the ramp down in Week 6 instead of Week 8.

FOR LARGER PLANTS: (A Longer Vegetative Stage) All measurements are in ml/gallon

| Seedling | PPM | Veg 1 | Veg 2 |
|---|---|---|---|
| Week 1 | 150 | 5 | 5 |
| Week 2 | 300 | 10 | 10 |

| Veg | PPM | Veg 1 | Veg 2 |
|---|---|---|---|
| Week 1 | 500 | 18 | 18 |
| Week 2 | 700 | 26 | 26 |
| Week 3 | 900 | 33 | 33 |
| Week 4 | 1100 | 41 | 41 |
| Week 5 | 1300 | 49 | 49 |
| Week 6 | 1300 | 49 | 49 |

| Bloom | PPM | Bloom 1 | Bloom 2 | Sweetener |
|---|---|---|---|---|
| Week 1 | 1300 | 36 | 36 | 0 |
| Week 2 | 1300 | 36 | 36 | 0 |
| Week 3 | 1300 | 36 | 36 | 0 |
| Week 4 | 1300 | 35 | 35 | 15 |
| Week 5 | 1300 | 34 | 34 | 22 |
| Week 6 | 1300 | 33 | 33 | 27 |
| Week 7 | 1300 | 31 | 31 | 40 |
| Week 8* | 900 | 24 | 24 | 31 |
| Week 9* | 700 | 16 | 16 | 21 |
| Week 10* | 500 | 11 | 11 | 15 |

*Ramp down the feed per this schedule or however you deem appropriate for your flush. Adjust per strain as necessary. This schedule was designed for a 10 week flowering cycle. Strains with 8 week flowering cycles should begin the ramp down in Week 6 instead of Week 8.

FIG. 16

PRODUCT, SYSTEM AND METHOD FOR AN IMPROVED FERTILIZER

CROSS-REFERENCE TO RELATED APPLICATIONS

This application claims the benefit of U.S. Provisional Application No. 62/785,021, filed Dec. 26, 2018, the entire contents of which are incorporated herein by reference.

FIELD OF THE DISCLOSURE

The present invention relates generally to an improved fertilizer, and particularly to a fertilizer derived largely from fish excrement extracted from a reduced sodium artificial ocean water environment for applications in improving plant health, yield, and growth rates.

BACKGROUND OF THE DISCLOSURE

Fertilizers have been employed for many decades. It has been popular to employ certain animal waste products to enhance yield and growth rates of various plants.

There has been an ongoing need to improve consumable plant yields (e.g., the amount of harvestable products derived from a plant, such as a fruit or vegetable, flowers, leaves, buds, stems, roots or otherwise, per unit area or volume of plantable space). Likewise, there has been an ongoing need to improve consumable plant growth rates, to thereby increase the consumable amount (whether in overall quantity, size, or both) of harvestable products derived from a plant per unit time.

Fish by-products have been used in the development of plant fertilizers. A good source of nutrients for plants may be found in fish excrement. However, fish excrement reclaimed as skimmate from a natural ocean water or artificial ocean water environment includes a high concentration of sodium which is harmful to plants. Removing sodium from skimmate obtained from natural ocean water is not economical and is typically destructive to the microbial value, from the skimmate.

There is also an ongoing need for improved fertilizer formulations regarded as environmentally benign. Moreover, there is a need for improved formulations that could be certified as organic (e.g., it would meet the standards required by at least one certifying body such as Organic Materials Review Institute ("OMRI") or any other similar certifying body) and employed as a fertilizer.

Examples of efforts by others to improve fertilizer formulations include United States Patent Application 20110247378; United States Patent Application 20100175441; United States Patent Application 20070012078; and U.S. Pat. No. 9,604,887.

SUMMARY OF THE DISCLOSURE

The above needs are met by the present invention which contemplate improved fertilizer ingredients using skimmate extracted from a reduced sodium artificial ocean water environment for an improved fertilizer formulation, as well as methods employing the ingredients and/or formulation.

In one of its various general aspects, the teachings herein are directed toward certain of the steps performed to produce a fertilizer composition. By way of illustration, a reservoir may be filled with a predetermined volume of a reduced sodium, artificial ocean water solution, wherein the reduced sodium, artificial ocean water solution contains at least one reduced sodium salt compound blend. Optionally at least one microorganism (e.g., bacteria or fungi) may also be introduced into the reservoir. After at least one salt compound blend is at least partially dissolved, and any microorganism is mixed with the water, fish may be introduced into the reservoir at a concentration of about 1-20 fish per gallon of volume of the reduced sodium artificial ocean water solution. The fish are fed for causing the production of fish excrement (i.e., skimmate). The skimmate may have an initial composition and may be reclaimed for use as a fertilizer. The reclaimed skimmate may be mixed with at least one additive for modifying the skimmate from its initial composition for forming a modified skimmate composition. The skimmate with the initial composition or the modified composition may be employed as a fertilizer composition.

In furtherance of one of its general aspects, the teachings herein include that the reduced sodium, artificial ocean water solution further comprises trace elements found in natural ocean water or artificial ocean water. The trace elements include one or more of calcium, magnesium, potassium, bromine, boron, strontium, sulfur, lithium, silicon, vanadium, zinc and manganese. In some embodiments, the concentration level of magnesium is between 1300 and 2200 ppm and more preferably between 1500 and 1800 ppm, the concentration level of calcium is between 300 and 1300 ppm and more preferably between 400 and 800 ppm, and the concentration of potassium is between 300 and 600 ppm and more preferably between 350 and 450 ppm.

The at least one salt compound blend includes at least one salt compound (i.e., chemical compound formed from the reaction of an acid and a base) that contain little or no sodium. Examples of sodium-less salts include, but are not limited to, Dead Sea salt, Epsom salt, and calcium chloride.

As will be discussed, among its various general aspects, the present teachings are directed toward unique aspects of fishkeeping that reliably and predictably result in the ability to cultivate a fish population having a density that far exceeds the typical density of fish kept outside of their natural habitat.

In one of its various general aspects, the teachings herein are directed toward reclaiming at least a portion of skimmate that is produced by a population of at least 1,000 (or at least about 10,000, or at least about 25,000, or at least about 100,000) fish residing in a reservoir (e.g., a tank) in a concentration of about 1 to about 20 fish per gallon of a reduced sodium, artificial ocean water solution of the present invention. The reclaimed skimmate has a reduced concentration of sodium as compared to skimmate reclaimed from a natural ocean water or artificial ocean water environment found in a typical salt water aquarium or in other environments for raising salt water fish, such as fish farms and hatcheries. The reduced sodium content of the reclaimed skimmate is a result of the reduced sodium, artificial ocean water solution from which it was reclaimed. Optionally, the reclaimed skimmate may be mixed with one or more additives to form a fertilizer composition, or may be usable substantially as reclaimed as a fertilizer. For example, a fertilizer formulation herein may include at least the skimmate mixed with at least one additive. Examples of additives may include one or any combination of a source of nitrogen (possibly derived from hydrolyzed fish scraps, such as Dramm® DRAMMATIC "ONE", Dramm® DRAMMATIC "O", or similar commercially available, preferably certified organic product), a source of phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), a source of potassium (possibly derived from Norwegian seaweed (*Ascophyllum nodosum*), such as Maxicrop® Soluble Seaweed Powder, or similar commercially available, preferably certified organic product), and a source of silicon (possibly derived from volcanic minerals or naturally occurring sand, such as Silica Earth® Volcanic Silica Minerals, or similar commercially available, preferably certified organic product).

A method of the present teachings in one general aspect is directed toward reclaiming at least a portion of the skimmate which is produced by a population of at least 1,000 (or at least about 10,000, or at least about 25,000, or at least about 100,000) fish (e.g., of a poeciliidae type) residing in a reservoir in a concentration of about 1 to about 20 fish per gallon of the reduced sodium, artificial ocean water solution. The skimmate that is reclaimed may be mixed with one or more additives to form a fertilizer composition.

It is possible that one or more additives mixed with reclaimed skimmate may include (a) a source of nitrogen (possibly derived from hydrolyzed fish scraps, such as Dramm® DRAMMATIC "ONE", Dramm® DRAMMATIC "O", or similar commercially available, preferably certified organic product), (b) a source of phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), (c) a source of potassium (possibly derived from Norwegian seaweed (*Ascophyllum nodosum*), such as Maxicrop® Soluble Seaweed Powder, or similar commercially available, preferably certified organic product), and (d) a source of silicon (possibly derived from volcanic minerals or naturally occurring sand, such as Silica Earth® Volcanic Silica Minerals, or similar commercially available, preferably certified organic product).

In another of its various general aspects, the teachings herein are directed toward a reduced sodium, artificial ocean water solution. The reduced sodium, artificial ocean water solution includes distilled, purified, or deionized water or any combination thereof, at least one salt compound blend substantially devoid of sodium, and trace elements found in natural ocean water. The trace elements include one or more of calcium, magnesium, potassium, bromine, boron, strontium, sulfur, lithium, silicon, vanadium, zinc and manganese. The trace elements are in either elemental or ionic form. The reduced sodium, artificial ocean water solution can contain less than 2500 mg/L, less than 2000 mg/L, less than 1500 mg/L, less than 1100 mg/L, less than 1000 mg/L, less than 500 mg/L, less than 100 mg/L of sodium, preferably less than 50 mg/L of sodium, and more preferably no or 0 mg/L of sodium.

In still another of its various general aspects, the teachings herein are directed toward a process of producing skimmate from a reduced sodium, artificial ocean water environment, wherein the skimmate has a reduced concentration of sodium. The process includes filling a reservoir with a predetermined volume of distilled, purified or deionized water, adding at least one salt compound blend devoid of sodium, adding trace elements found in natural ocean water, optionally introducing at least one type of bacteria into the reservoir. After the at least one salt compound blend is partially dissolved, and the cultured bacteria are mixed with the water, introducing fish into the reservoir at a concentration of about 1 to about 20 fish per gallon. The fish are fed a USDA Organic certified food compound causing the production by the fish of digestive waste; and reclaiming the skimmate with a protein skimmer. The skimmate has a reduced concentration of sodium as compared to skimmate reclaimed from natural ocean water or artificial ocean water environments, as previously noted, due to the reduced sodium, artificial ocean water from which it was reclaimed. The trace elements include one or more of calcium, magnesium, potassium, bromine, boron, strontium, sulfur, lithium, silicon, vanadium, zinc and manganese, and the cultured bacteria includes at least one Nitrobacteraceae type bacteria (e.g., one or more selected from *Nitrosomonas* (ammonia-oxidizers), *Nitrobacter* (nitrite-oxidizers), *Nitrosococcus*, or *Nitrococcus*). The skimmate can also include bacteria, reverse osmosis deionized water, and minerals and/or trace elements from the salt compounds.

In still a further of its various general aspects, the teachings herein are directed to a skimmate manufactured by the above-described process having a reduced sodium concentration level.

In some embodiments, a plant fertilizer includes skimmate, wherein the skimmate has a sodium concentration of less than 1500 mg/L; a source of potassium; a source of silicon; and a pH reducing agent. In some embodiments, the plant fertilizer includes a root growth enhancer. In some embodiments, the root growth enhancer comprises at least one microorganism. In some embodiments, the at least one microorganism is a fungi. In some embodiments, the fungi comprises endomycorrhizal and/or ectomycorrhizal fungi. In some embodiments, the plant fertilizer comprises at least 7.5 g/L of the root growth enhancer. In some embodiments, the plant fertilizer includes a source of phosphorus and nitrogen. In some embodiments, the source of phosphorus and nitrogen comprises hydrolyzed fish scraps. In some embodiments, the plant fertilizer comprises at least 9% the source of phosphorus and nitrogen by volume of the plant fertilizer. In some embodiments, the plant fertilizer includes water. In some embodiments, the water comprises deionized and/or reverse osmosis water. In some embodiments, the plant fertilizer comprises at least 25% water by volume of the plant fertilizer. In some embodiments, the plant fertilizer comprises at least 25% skimmate by volume of the plant fertilizer. In some embodiments, the source of potassium comprises *Axcophyllum nodosum*. In some embodiments, the plant fertilizer comprises at least 5 g/L of the source of potassium. In some embodiments, the plant fertilizer comprises 0.1-1% the source of silicon by volume of the plant fertilizer. In some embodiments, the pH reducing agent comprises an organic acid. In some embodiments, the plant fertilizer comprises 0.05-0.4% the pH reducing agent by volume of the plant fertilizer. In some embodiments, the plant fertilizer includes a gelling agent. In some embodiments, the plant fertilizer comprises 5-10 g/L the gelling agent. In some embodiments, the plant fertilizer includes a rooting hormone. In some embodiments, the plant fertilizer comprises 0.1-0.5 g/L the rooting hormone. In some embodiments, the plant fertilizer includes a fungicide. In some embodiments, the plant fertilizer comprises 0.1-0.5 g/L the fungicide. In some embodiments, the plant fertilizer includes a smell masking agent. In some embodiments, the plant fertilizer comprises 0.1-0.4% smell masking agent by volume of the plant fertilizer. In some embodiments, the plant fertilizer includes a moisture adding agent. In some embodiments, the plant fertilizer comprises about 1-4% moisture adding agent by volume of the plant fertilizer.

In some embodiments, a plant sweetener composition includes a plurality of sugar sources; potassium metabisulfite; a pH reducing agent; and water. In some embodiments, the plurality of sugar sources comprises at least one selected from the group consisting of date syrup, yacon syrup, agave nectar, coconut sugar, honey, molasses, sorghum syrup, and muscovado sugar. In some embodiments, the plant sweetener composition comprises 20-30 g/L of each sugar source in the plurality of sugar sources. In some embodiments, the plant sweetener composition comprises 1-3 g/L potassium metabisulfite. In some embodiments, the plant sweetener composition comprises 0.05-2% pH reducing agent by volume of the plant sweetener composition. In some embodiments, the plant sweetener composition comprises 70-95% water by volume of the plant sweetener composition.

BRIEF DESCRIPTION OF THE FIGURES

The foregoing summary, as well as the following detailed description of the invention will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

FIG. 3 is an example comparison of the concentration levels of the macro-elements found in both the reduced sodium, artificial ocean water of the present invention and natural ocean water.

FIG. 4 is an example comparison of the concentration levels of the Li-group elements found in both the reduced sodium, artificial ocean water of the present invention and natural ocean water.

FIG. 5 is an example comparison of the concentration levels of the I-group elements found in both the reduced sodium, artificial ocean water of the present invention and natural ocean water.

FIG. 6 is an example comparison of the concentration levels of the Fe-group elements found in both the reduced sodium, artificial ocean water of the present invention and natural ocean water.

FIG. 7 is an example comparison of the concentration levels of the Ba-group elements found in both the reduced sodium, artificial ocean water of the present invention and natural ocean water.

FIG. 8 is an example comparison of the concentration levels of the Si-group elements found in both the reduced sodium, artificial ocean water of the present invention and natural ocean water.

FIG. 9 is an example comparison of the concentration levels of the Nutrient-group elements found in both the reduced sodium, artificial ocean water of the present invention and natural ocean water.

FIG. 10 is an example comparison of the concentration levels of the Unwanted heavy metal elements found in both the reduced sodium, artificial ocean water of the present invention and natural ocean water.

FIG. 16 are exemplary recommended feeding schedules using the plant fertilizers disclosed herein.

DETAILED DESCRIPTION OF THE DISCLOSURE

Figure 1:
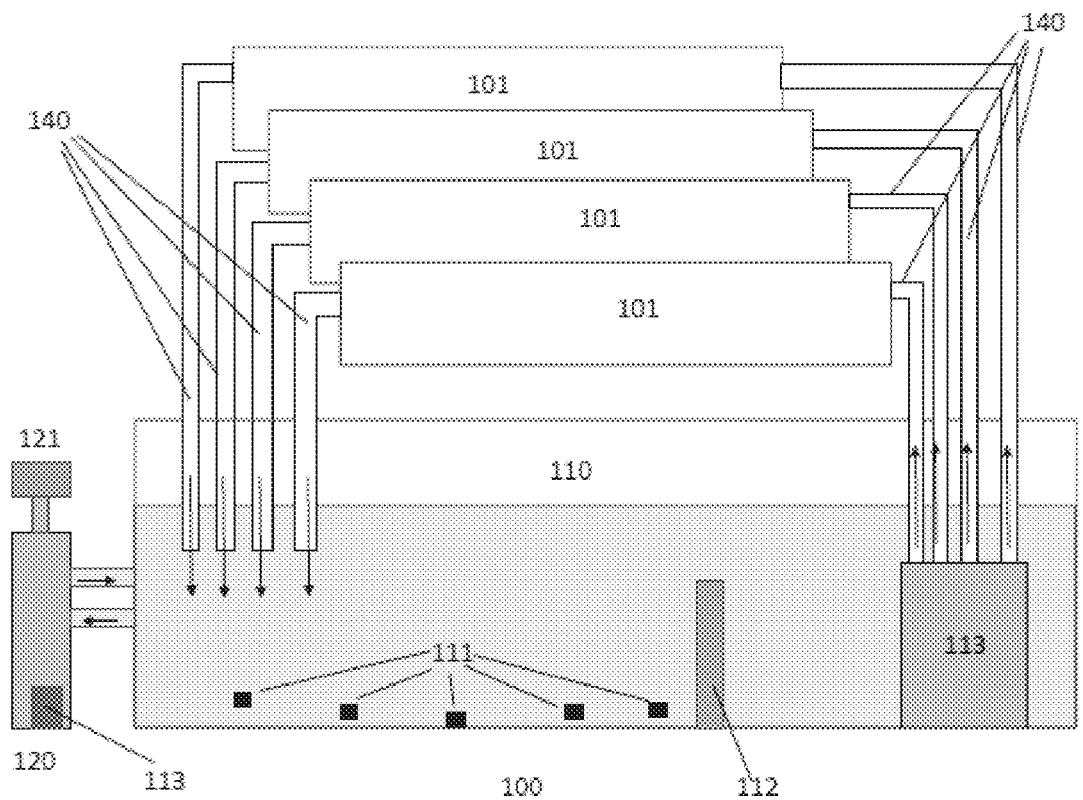
FIG. 1 is flow diagram of an embodiment of the present invention.

The present subject matter will now be described more fully hereinafter with reference to the accompanying figures, in which representative embodiments are shown. The present subject matter can, however, be embodied in different forms and should not be construed as limited to the embodiments set forth herein. Rather, these embodiments are provided to describe and enable one of skill in the art. Unless otherwise defined, all technical and scientific terms used herein have the same meaning as commonly understood by one of ordinary skill in the art to which the subject matter pertains. All publications, patent applications, patents, and other references mentioned herein are incorporated by reference in their entirety.

Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used herein, the terms "comprising," "comprise" or "comprised," and variations thereof, in reference to defined or described elements of an item, composition, apparatus, method, process, system, etc. are meant to be inclusive or open ended, permitting additional elements, thereby indicating that the defined or described item, composition, apparatus, method, process, system, etc. includes those specified elements—or, as appropriate, equivalents thereof—and that other elements can be included and still fall within the scope/definition of the defined item, composition, apparatus, method, process, system, etc.

The term "about" or "approximately" means within an acceptable error range for the particular value as determined by one of ordinary skill in the art. For example, "about" can mean within 1 or more than 1 standard deviation, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

Artificial Ocean Water means a water environment that simulates natural ocean water having a sodium concentration level of approximately 10,700 mg/L. An artificial ocean water environment may be found in typical salt water aquariums, fish farms, hatcheries and the like.

"Optional" or "optionally" means that the subsequently described event or circumstance can or cannot occur, and that the description includes instances where the event or circumstance occurs and instances where it does not.

"Fish excrement" means the fish digestive waste which is generally solid or semi-solid.

"Skimmate" means organic waste, primarily fish excrement, together with trace amounts of uneaten food and proteins, microorganisms, reverse osmosis deionized water, and minerals/trace elements.

"Protein Skimmer" also known as a foam fractionator that removes skimmate from an aquatic environment.

"Organic" is meant to encompass USDA Certified and naturally occurring carbon-based forms usually associated with vegetation.

"Organic certification" is a certification process for producers of organic food and other organic agricultural products. Requirements vary from country to country and generally involve a set of production standards for germinating, growing, harvesting, storage, processing, packaging and shipping that include: no human sewage sludge fertilizer used in cultivation of plants or feed of animals; avoidance of synthetic chemical inputs not on the National List of Allowed and Prohibited Substances (e.g. fertilizer, pesticides, antibiotics, food additives and so forth); no genetically modified organisms; no irradiation; the use of farmland sewage sludge: that has been free from prohibited synthetic chemicals for a number of years (often, three or more); tracking of product from seed germination to harvest; accurate labeling and notification of Certifying body; keeping detailed written production and sales records; maintaining strict physical separation of organic products from non-certified products; and undergoing periodic on-site inspections.

A preferred embodiment of the invention is the production of skimmate having a reduced sodium concentration level reclaimed from a unique, reduced sodium, artificial ocean water environment. The process of which includes creating an artificial ocean water environment which has a significantly reduced amount of sodium (chemical symbol Na) compared to artificial ocean water environments. Aquatic organisms (e.g., fish), which are sustainable in a reduced sodium artificial ocean water environment are introduced for the purpose of producing skimmate that is harvested. The skimmate becomes the primary ingredient for an improved plant fertilizer. Additives, in varying quantities and kind, may be added to the skimmate to produce the improved plant fertilizer.

Reduced Sodium, Artificial Ocean Water Solution

Typically, artificial ocean water may be created to simulate natural ocean water environments. These environments may be found in typical salt water aquariums, fish farms, and/or hatcheries. The primary compound of ocean water, natural or artificial, is sodium chloride (NaCl). In an illustrative example, sodium (chemical symbol Na) in natural ocean water or artificial ocean water may have a concentration of 10,700 mg/L. Sodium in a plant fertilizer is not desired, and instead of promoting growth can kill the plants. Alternative sources of salt having a low or zero concentration of sodium, such as, but not limited to, Epsom salt, calcium chloride, and Dead Sea salt, may be used in the preparation of the reduced sodium, artificial ocean water environment. Other sources of reduced sodium salts are contemplated.

The reduced sodium, artificial ocean water environment of the present invention can significantly reduce the sodium in the composition compared to other artificial ocean water environments. While the reduced sodium, artificial ocean water of the present invention comprises compounds similar to natural ocean water or artificial ocean water with the exception of sodium, the amount of those compounds in the reduced sodium, artificial ocean water may vary in comparison to that of natural ocean water.

Likewise, the amount of other ingredients (e.g., trace elements) may differ (e.g., be higher or lower) from the normal amounts present in natural ocean water. The amounts may differ by at least about 30% of the normal amount, by at least about 50% of the normal amount or higher. Accordingly, the salts for use in the reduced sodium, artificial ocean water of the present teachings are selected to deviate from naturally occurring aquatic environments by being reduced sodium. Preferably, the salts used in the reduced sodium, artificial ocean water may be certifiable as organic or naturally sourced (ie using wooden extraction equipment instead of metal tools), or they may preferably be employed to provide a product that is certifiable as organic. The salts desirably have no heavy metals therein.

It is possible that one or more of the compounds or elements present (whether in elemental or ionic form) in the reduced sodium, artificial ocean water may be present at a level a level different from, and at least about 10%, at least about 50%, at least about 200% or at least about 500% higher than the amount present in natural ocean water. It is possible that one or more of the compounds or elements present (whether in elemental or ionic form) in the reduced sodium, artificial ocean water solution may be present at a level different from, but less than about 600%, less than about 400%, less than about 200% or less than about 100% higher than the amount present in natural ocean water. It is possible that one or more of the compounds or elements present (whether in elemental or ionic form) in the reduced sodium, artificial ocean water may be present at a level different from, and at least about 5%, at least about 20%, at least about 35% or at least about 50% of the amount present in natural ocean water. It is possible that one or more of the compounds or elements present (whether in elemental or ionic form) in the reduced sodium, artificial ocean water may be present at a level different from, but below about 80%, below about 70%, or below about 60% of the amount present in natural ocean water.

By way of example, the amount of potassium (whether in elemental or ionic form) may be at a level that is from about 10 to 20 percent lower and more preferably between 10 and 15% less than the amount of potassium in natural ocean water. The concentration of strontium may be about 5 to about 50 percent higher than in natural ocean water, and more preferably 15 to 35% higher than in natural ocean water.

Table 1 illustrates approximate concentrations of elements (whether in elemental or ionic form) present in one illustrative salt water solution of the present teachings (for a solution having a salinity of about 15 ppt). Trace amounts (e.g., below about 0.07 μg/L) may be present of one or more elements (or their respective ion) selected from one or more of nickel, aluminum, molybdenum, vanadium, zinc, iodine, or barium. The concentrations may vary +/−10%, 20% or 30% of the stated amounts.

TABLE 1

| Element | Approximate Amount in Reduced Sodium, Artificial Ocean Water | Approximate Amount in Natural Ocean Water |
| --- | --- | --- |
| Na | ~1000 (mg/L) ppm | 10,700 (mg/L) ppm |
| Ca | 350-800 (mg/L) ppm | 440 (mg/L) ppm |
| Mg | 1300-2000 (mg/L) ppm | 1370 (mg/L) ppm |
| K | 300-500 (mg/L) ppm | 400 (mg/L) ppm |
| Br | 40-70 (mg/L) ppm | 62 (mg/L) ppm |
| B | 2-5 (mg/L) ppm | 4.5 (mg/L) ppm |
| Sr | 7-13 (mg/L) ppm | 8 (mg/L) ppm |
| S | 500-4000 (mg/L) ppm | 900 (mg/L) ppm |
| Li | 300-750 (μg/L) ppb | 200 (μg/L) ppb |
| Si | 400-1500 (μg/L) ppb | 100 (μg/L) ppb |
| V | 0-2 (μg/L) ppb | 1.2 (μg/L) ppb |
| Zn | 8-15 (μg/L) ppb | 4 (μg/L) ppb |
| Mn | 0-5 (μg/L) ppb | 2 (μg/L) ppb |

Noted in Table 1 is that sodium has a concentration of 1000 milligrams per liter (mg/L) or over 10 times less sodium than natural ocean water. In some embodiments, the reduced sodium, artificial ocean water of the present invention has less than about 2000 mg/L sodium, less than about 1500 mg/L, less than about 1100 mg/L, less than about 1000 mg/L sodium, less than about 750 mg/L sodium, less than about 500 mg/L sodium, less than about 250 mg/L sodium, less than about 75 mg/L sodium, less than about 50 mg/L sodium, less than about 25 mg/L sodium and more preferably 0 mg/L of sodium, effectively making the artificial ocean water a reduced sodium environment.

FIGS. 3-10 are example comparison of the concentration levels of the various elements found in both the reduced sodium, artificial ocean water of the present invention and natural ocean water. Various tests have indicated a minor deviation in the concentration levels, particularly with respect to sodium (Na) where various tests have shown zero concentration of this element in the reduced sodium, artificial ocean water of the present invention.

Various test results have found a deviation in the concentration levels of the macro elements by +/−10% to +/−100% of the stated amounts. Additionally, the concentration levels in certain tests found outliers of +/−400%.

As noted previously, other elements of the reduced sodium, artificial ocean water of the present invention may have a higher concentration than that of natural ocean water. Two such macro elements are Calcium (Ca) and Magnesium (Mg). The calcium concentration in the reduced sodium, artificial ocean water of the present invention is approximately 1.5 to 2 times what is found in natural ocean water, and the magnesium level is at least 110%, and more preferably 150% greater than in natural ocean water. Including higher concentrations of these elements can result in a higher concentration of these same elements in the skimmate that is harvested from the reduced sodium, artificial ocean water environment.

The method of producing the reduced sodium, artificial ocean water solution includes providing a reservoir that is at least partially filled with a predetermined amount of water that may be distilled, purified, deionized (e.g., by reverse osmosis de-ionization ("RO/DI")) or any combination thereof. For example, the reservoir may contain between 100 liters (L) and 100,000 L of water. The reservoir may be equipped with one or more of a temperature control unit (e.g., a heater and/or refrigeration system for attaining and/or maintaining one or more predetermined temperatures for one or more predetermined times). The reservoir may be equipped with of a fluid circulation system (e.g., including a pump, an impeller or both), a filter, or both. The reservoir may have a predetermined size, shape, and/or fill capacity. For example, it may include a generally rectangular prism shape, or a generally cylindrical shape. It may have a shape that resembles a raceway (e.g., generally rectangular, circular or oval, with a central region that includes a structure (e.g., a rock formation) for defining a raceway path). It may have a depth of at least about 0.2 meters (m), at least about 1 m, or at least about 3 m. It may have a depth below about 10 m, below about 7 m, or below about 5 m. It may have a length or diameter of at least about 1 m, at least about 3 m or at least about 5 m. It may have a length or diameter of below about 30 m, below about 20 m or below about 10 m. It may have a width of at least about 1 m, at least about 3 m or at least about 5 m. It may have a width below about 30 m, below about 20 m or below about 10 m. Larger sized reservoirs than those taught herein can be employed as well. Also, a system of plural reservoirs may be employed.

At least partially dissolved in the water is a predetermined amount of at least one reduced sodium or reduced sodium salt formulation. The salt formulation may comprise a plurality of individual salt compounds that are separately mixed with the water. Alternatively, it may include a blend of a plurality of individual salt compounds that are simultaneously mixed with the water. The salt formulation is prepared in a manner for achieving an environment resembling natural ocean water with a significantly reduced amount of sodium. That is, the salt formulation may be prepared from desired amounts of a plurality of different salt sources selected to resemble an oceanic environment in one or more properties such as alkalinity. In other aspects (except, for example, the salinity of), the reduced sodium, artificial ocean water of the present invention can be the same as that of natural ocean water. The salt formulation may be prepared from desired amounts of a plurality of different salt sources selected to simulate a modified oceanic environment, without any sodium, as to the presence of one or any combination of metallic (e.g., transition metal, alkali metal, and/or alkaline earth metal) or other elements. For example, the salt formulation may be prepared from desired amounts of a plurality of different salt sources that include the presence of one or any combination elements (or their respective ions) selected from lithium, calcium, magnesium, potassium, bromine, boron, strontium, sulfur, nickel, molybdenum, vanadium, zinc, manganese, iodine, chlorine, barium, beryllium, silicon, aluminum, or phosphorus.

The salt formulation may be realized by individually adding a plurality of respective salts to the water, by mixing a plurality of salt compounds to form a blend that is added to the water, or both. For example, one approach may employ mixing predetermined amounts of salts selected from at least two of Dead Sea salt, Epsom salt, and calcium chloride. For example, at least one salt compound blend may include at least two salt compounds selected from, but not limited to, Dead Sea Salt, Epsom Salt and calcium chloride and commercially available salt mixtures such as B-IONIC SEAWATER SYSTEM SALT MIX. If calcium chloride is one of the salt compounds, it may have a weight ratio relative to any Dead Sea salt present of about 0.1-0.3 or about 0.2 and any Epson salt present of about 0.6-1, about 0.7-0.9, or about 0.8. A salt blend of Dead Sea salt and Epson salt may have a weight ratio of about 2:1, about 3:1, about 4:1, about 5:1, or about 6:1 (i.e., 2:1-6:1).

The total amount of salt necessary to be dissolved in the water is such that specific gravity of the reduced sodium, artificial ocean water is about 1.008-1.015, about 1.010-1.0114, or about 1.011-1.013, about half the specific gravity level found in natural ocean water (1.025 or 1.026). The salinity value of the reduced sodium, artificial ocean water is preferably between 14 and 18 ppt (parts per thousand), whereas the salinity value of natural ocean water is approximately 35 ppt.

Reduced Sodium Skimmate

The method of the present teachings in one general aspect is directed toward reclaiming at least a portion of skimmate. The skimmate may be produced by a population, for example, of at least 1,000 (or at least about 10,000, or at least about 25,000, or at least about 100,000) fish residing in a reservoir containing the reduced sodium, artificial ocean water of the present invention in a population density of about 1 to about 20 fish per gallon of water, or more preferably about 2 to about 3 fish per liters of the reduced sodium, artificial ocean water of the present invention.

The present teachings address generally a process by which a reservoir is filled with reduced sodium, artificial ocean water of the present invention described above and optionally at least one microorganism (and fish) to produce fish excrement that can be harvested as skimmate from the reservoir for use in an improved plant fertilizer. The method may include steps of filling a reservoir with a predetermined volume of the reduced sodium, artificial ocean water described above. The reservoir may be connected to various mechanical devices such as one or more overflow tank(s), protein skimmer(s), sump(s), fluidized bed(s), pump(s) (water and/or air), various reactors (for example, but not limited to, carbon, biopellets, phosphate (GFO), that are found in known aquatic systems) and feeder(s). It is contemplated that if more than one reservoir is used, each reservoir may comprise a complete system or alternatively be part of a larger interconnected system. The connection of these mechanical devices and reservoir(s) is known in the industry. The system allows for periodic replacement of a percentage of the reduced sodium, artificial ocean water. Such replacement may comprise 10% on a weekly, bi-monthly or monthly basis.

FIG. 1 is a basic flow diagram of the reduced sodium, artificial ocean water system (100) of the present invention. The system may comprise one or more aquaculture or reservoir tanks (101) capable of holding 300 gallons. As noted above, the reservoir tanks may comprise different sizes and shapes. The one or more reservoirs (101) may be connected to a sump/reactor (110) (e.g., Kaldnes or bioball Reactor) containing reactor bio media and bacteria cultures (111). An additional reservoir (not shown) containing unsalted water may be connected to the sump. This additional reservoir can function to pump unsalted water into the sump as water evaporates from the system. The sump/reactor can be connected to a protein skimmer (120) as well as the one or more reservoir tanks (101). The system of the present invention can create a closed circuit between the one or more reservoir tanks (101), and the sump/reactor (110). The sump/reactor may also comprise one or more heaters (112) to maintain a constant water temperature, one or more pumps (113) to maintain the water flow through the system. In FIG. 1, the protein skimmer (120) is external to the sump/reactor. It is possible that the protein skimmer (120) may be located within the sump/reactor (110). A pump (113) may be located at the bottom of the protein skimmer (120) for pumping air into the skimmer to aerate the skimmate. PVC piping (140), or similar material may be used to interconnect the system components. A collection vessel (121) can be part of the protein skimmer (120) to capture the reclaimed skimmate from protein skimmer.

The reduced sodium, artificial ocean water system may require periodic maintenance to ensure the system is functioning properly and that the chemical conditions of the reduced sodium, artificial ocean water is capable of sustaining live fish. This periodic maintenance may extend beyond the periodic replacement of a partial amount of the reduced sodium, artificial ocean water. In some embodiments, periodic maintenance, preferably performed on a weekly basis, includes removing dead fish from the reservoir(s), as well as testing the reduced sodium, artificial ocean water's pH, temperature, specific gravity, ammonia, nitrate, and/or nitrite. If the pH is below 7.0, sodium bicarbonate may be added to the reservoirs. Similarly, if the nitrite level exceeds 30, bacteria may be added to the system. Calcium, potassium and magnesium concentration levels may also be tested. Additionally, all mechanical devices such as pumps, protein skimmers, may be checked, cleaned and/or calibrated as necessary. The interconnectivity of the mechanical devices with the reservoir(s) may be checked for potential or actual leaks. Additional maintenance is also contemplated such as testing the RO/DI water for impurities prior to mixing and replacing RO/DI cartridges and resins, as necessary. For example, a periodic water change on the system to remove as much as 5-10% of the reduced sodium, artificial ocean water and replace it with new reduced sodium, artificial ocean water can adjust levels of the elements and/or reduce levels of unwanted elements, such as nitrites or ammonia which may be harmful to the fish.

The frequency of the periodic maintenance may be increased or reduced depending on the conditions of the system. Furthermore, it is contemplated while the above reduced sodium, artificial ocean water system is in operation, new reservoirs of the reduced sodium, artificial ocean water may be prepared.

Prior to adding fish into the reservoirs, it is contemplated that at least one microorganism (e.g., one or more bacteria) may be introduced. The microorganism may be introduced into the reservoir for managing (e.g., limiting amounts of) existing toxins and/or controlling the liberation of toxins that may be deleterious to the fish. The microorganism(s) may perform a denitrification function. For instance, the microorganism may be suitable and may be used for converting nitrites that may be present in the reservoir to nitrates, or reducing the amount of any ammonia present, or both.

It is envisioned that the microorganism (e.g., bacteria) can be present in the reservoir for a period of time prior to introduction of fish into the reservoir. However, one or more steps may be employed for introducing one or more amounts of such microorganism into the reservoir after fish are already residing in the reservoir. It may be possible to culture the microorganism in a container and transfer it from the container to the reservoir. It may be possible to culture the microorganism on a substrate (e.g., a biofilm carrier) that is introduced into the reservoir, and then is agitated to remove the microorganism from the substrate and to then distribute the microorganism within the reservoir. It may also be possible to culture the microorganism on a substrate (e.g., a biofilm carrier) that is agitated to separate the microorganism from the substrate before the microorganism is introduced into the reservoir, and, then distributed within the reservoir.

By way of illustration, the microorganism may be bacteria that has been cultured for introducing into the reservoir and creating an environment with the reduced sodium, artificial ocean water solution that is conducive for and nontoxic to the fish that are introduced into the reservoir. The bacteria may include at least one Nitrobacteraceae type bacteria (e.g., one or more selected from *Nitrosomonas* (ammonia-oxidizers), *Nitrobacter* (nitrite-oxidizers), *Nitrosococcus*, or *Nitrococcus*. The bacteria or other microorganism may be used in any suitable amount, and/or time for achieving the desired environment within the reservoir. An example of a commercially available source of bacteria is Fritz Zyme® Turbo Start, available from Fritz Industries, Inc.

Optionally the bacteria (or other microorganisms) may be prepared for introduction into the reservoir by growing an active biofilm on a suitable carrier suspended in a reactor. For example, the active biofilm may be supported on one or more plastic biofilm carriers (e.g., constant profile hollow filter media having a diameter from about 6 to about 25 mm and a height of about 6 to about 12 mm, such as is available under the designation K1, K2 and K3), such as a thermoplastic (e.g., polyethylene) carrier suspended in water contained in the reactor. The reactor may be a fluidized bed containing pool filter sand or granite chips. The reactor may be a moving bed biofilm reactor, such as has previously been commercialized as a Kaldnes Miljøteknologi or bioball reactor (typically employed for wastewater treatment) filled with bio balls. One or more other biofilm reactors may be employed, such as those used for other biofilm processes for wastewater treatment such as a trickling filter, rotating biological contactor, fluidized bed, and/or a biological aerated filter. One or more other agents, substrates or other item may be introduced into the reactor and/or the reservoir for promoting growth of the microorganism.

In addition, "ghost feeding" the reservoirs before the fish are added may be performed to promote the growth of the microorganism culture. For example, if a reservoir is to contain 1000 fish, one may "ghost feed" the tank for two to three weeks the amount of food that the 1000 fish would consume. This will force the bacteria culture to grow up to the size required to consume the food fed to the tank, resulting in an initial spike in ammonia, then nitrites, and then nitrates. This is called "cycling the tank" (cycling is a reference to taking the tank through the nitrogen cycle). When the ammonia, nitrates and nitrites levels are all reading zero, this indicates that the tank is "cycled" and the bacteria culture is large enough to break down the fish waste created by the 1000 fish. At this point, the fish can be safely introduced to the tank without the normal resulting ammonia spike which would kill the fish.

The teachings herein may include a step of maintaining the pH of the water at about 7 to about 8, and more preferably between about 7.5 and about 7.7. This may be performed by controlling the addition of an organic acid, as was described above. It may also include adding a base (e.g., a hydroxide such as sodium hydroxide, a carbonate such as sodium carbonate, sodium bicarbonate or otherwise).

The teachings herein may include a step of maintaining the temperature of the water in the reservoir at about 21 to 30° C., more preferably between about 23 and 25° C.

Live fish may then be introduced into the reservoir at a concentration of about 1 to 20, or, more preferably, 7 to about 10 fish per gallon. The fish are for causing the production of the fish excrement and the resulting skimmate that has an initial composition containing a reduced amount of sodium as compared to skimmate reclaimed from a natural ocean water or artificial ocean water environment. The skimmate composition can be significantly reduced of sodium in comparison to skimmate reclaimed from reservoirs containing water with salinity levels similar to natural ocean water. In some embodiments, the concentration level of sodium in the skimmate reclaimed from the reduced sodium, artificial ocean water of the present invention can be approximately about 1000-1800 mg/L or ppm, or 1000-1100 mg/L or ppm, or 1100 mg/L or ppm, or 1,800 mg/L or 1,800 ppm. Whereas, skimmate reclaimed from a natural ocean water environment, which includes sodium, may have a sodium concentration of over 60,000 ppm.

The fish introduced into the reservoir may be fed and cared for over a prolonged period of time (e.g., more than about one week, more than about one month, more than about six months; and/or less than about five years, less than about three years, or less than about one year). The fish may be introduced at an initial concentration of about 1-20 or 7-10 fish per gallon of the reduced sodium, artificial ocean water of the present invention.

In some embodiments, the fish can start in freshwater (specific gravity=1.000) in a 300 gallon reservoir which is not yet connected to the primary aquaculture systems. An amount of fresh water can be removed and a similar amount of water from the main systems (the low sodium artificial ocean water described herein) can be added every day or every few days. The amount may vary from 1 gallon to 10 gallons. This can be done until the specific gravity of the new tank matches the specific gravity of the main system at which point the new tank can then be connected to the main systems.

Unique aspects of the present invention allow for fishkeeping that reliably and predictably results in the ability to cultivate a fish population having a density that far exceeds the typical density of fish kept outside of their natural habitat.

The fish employed herein may be fresh water fish or salt water fish. The fish may be ovoviviparous or viviparous. The fish may also be oviparous. The fish may have an average length of at least about 0.5 centimeter (cm), at least about 1 cm. The fish may have an average length below about 10 cm, below about 5 cm or below about 3 cm. Preferably, the fish may have an average length of between about 1 and about 5 centimeters. In some embodiments, the fish may be of the Poeciliidae type (e.g., one or more species such as *Poecilia reticulate, Xiphophorus maculatus, Xiphophorus hellerii*, cyprinodontiformes, *Poecilia sphenops*, or *Poecilia latipinna*) or the Tilapia type (e.g., *Oreochromis aureus*, commonly known as blue tilapia) or sea bass such as Mediterranean sea bass (e.g., bronzino), or a combination of both. Larger fish may be employed as well. In some embodiments, the fish introduced into the reservoir are *Poecilia sphenops*, commonly known as molly fish. Molly fish are tropical fish that can be sustained in a reduced sodium aquatic environment.

The fish are fed for causing the production of fish excrement. Skimmate, which is primarily composed of fish excrement, bacteria, minerals/trace elements from salt compounds and rodi water, may be recovered from the reservoir.

The fish may be fed a non-organic fish food or preferably a commercially available organic certified fish food, such as that available under the name AquaOrganic Fish Feed. The fish may be fed a diet of produce, preferably organic. The food used to feed the fish may contain relatively low amounts of fats or oils (e.g., below about 2.5% by weight). To illustrate, an example of one food may include a mixture of at least two or more of kale, spinach, broccoli, chard, carrot, apple, garlic, and a thickener (e.g., cornstarch). The produce may be chopped, mixed, dried (e.g., by baking), and ground into particles for feeding to the fish. The amounts of the produce (except for garlic) may be approximately equal for each item, with a variation of about +/−50% by weight. The garlic may be present in an amount of about one clove per 4-8 kilograms of produce. Drying may take place in an oven, such as by heating to about 175° to about 205° C. for about 20 to about 40 minutes.

The fish may be fed at regular intervals of about one hour, about four hours, about twelve hours or about twenty-four hours. Examples of food amounts for a population of Poeciliidae type fish (or other fish of like size) are at least about 250 to about 2000 milligrams (mg) of food per 100 fish in the reservoir. For example, to about one gram of food per day per 100 fish in the reservoir. The food may be distributed in a manner for helping to assure that substantially the entire population of the fish in the reservoir are fed in a single feeding. The feeding may be conducted in a manner to realize a substantially constant production of fish digestive waste.

Dead fish can be collected and placed in a mesh bag and put in the bioball reactor. The bacteria can break them down and the skimmer can reclaim them as part of the skimmate. Pumps in each tank can be employed to make the fish swim more which makes them hungrier and they therefore eat more and create more excrement to be extracted. The water temperature can be set to 75-78 degrees which increases fish metabolism and causes the fish to eat more food and therefore create more excrement. Lights can be set with timers to replicate a day/night cycle to keep the circadian rhythm of the fish constant. Air can be pumped into each tank to maintain dissolved oxygen levels high enough to keep dense populations of fish.

A skimmer device, preferably a protein skimmer, may be employed. As stated previously the skimmer may be employed in fluid communication with the reservoir. It may be located at least partially within the reservoir or completely external to the reservoir (e.g., in or on an adjoining structure), with one or more conduits through which liquid at least temporarily (e.g., the liquid may be recirculated back into the reservoir) removed from the reservoir may be passed. The skimmer may operate by co-current flow or counter-current flow. The skimmer may employ a principle of operation by which an air/water interface is created (e.g., by way of bubbling, such as to create a foam). As the bubbles rise in the skimmer (e.g., in a water column) they are able to attract (e.g., at an air/water interface) and carry certain organic molecules (e.g., hydrophobic molecules) to a collector receptacle wherein an accumulation of skimmate can result. The skimmer device is employed for recovering fish excrement according to the present teachings. The fish excrement is part of the skimmate that is harvested by the protein skimmer.

For a reservoir that contains about 3,000 liters of water, and about 10,000 fish, it is possible that the amount of skimmate reclaimed will be at least about 10, at least about 20 or at least about 30 liters a day.

The skimmer may collect a portion of the microorganism population present in the reservoir. Thus, the skimmate may include one or more microorganisms as a component. The skimmer may collect a portion of the food (described hereafter) that the fish did not eat. Thus, the skimmate may include uneaten food (described hereafter) for the fish.

A liquid component, a solid component, or both, of the skimmate may have an initial composition as described above. Said composition has a significantly reduced amount of sodium as compared to skimmate reclaimed from natural ocean water or an artificial ocean water environment.

A foaming agent may be added to the reservoir prior to reclaiming the skimmate using the protein skimmer. The foaming agent may promote the growth of skimmate and bacteria and improve the step of reclaiming the skimmate.

Because of this, the skimmate produced from this reduced sodium, artificial ocean water disclosed herein can have a sodium concentration of less than about 2000 mg/L, less than about 1500 mg/L, less than about 1100 mg/L, less than about 1000 mg/L sodium, less than about 750 mg/L sodium, less than about 500 mg/L sodium, less than about 250 mg/L sodium, less than about 75 mg/L sodium, less than about 50 mg/L sodium, less than about 25 mg/L. In some embodiments, the skimmate disclosed herein can have a sodium content of less than about 0.25%, less than about 0.20%, less than about 0.15%, less than about 0.11%, or less than about 0.10% based on a Guaranteed Analysis using the Fertilizer Secondary and Micronutrient Analytical Methods Manual and Official Methods of Analysis of AOAC International.

Improved Plant Fertilizer

The skimmate that is reclaimed or harvested from the reduced sodium, artificial ocean water may be mixed with one or more additives to form a fertilizer composition. To illustrate, reclaimed or harvested skimmate (which may include the solids content of the skimmate, any supernatant resulting from a separation of liquid and solid components of skimmate, or both; and which will include fish excrement, microorganisms, minerals/trace elements, and reverse osmosis/deionized water) may be mixed with at least one additive for modifying the composition of such skimmate from its initial composition for forming a composition having utility as a fertilizer for plants. In some embodiments, the fertilizer can be for *Cannabis*, hemp or marijuana plants. A fertilizer formulation herein includes at least the fish excrement (which may be in the form of skimmate) and an additive comprising one or any combination of a source of nitrogen, phosphorus, silicon, potassium, and iodine. At least one or more microorganisms may be added to the fertilizer formulation. Further, the fertilizer formulation may meet the requirements for being certified as organic.

In some embodiments, the plant fertilizers disclosed herein can include at least about 25%, at least about 30%, at least about 35%, at least about 40%, at least about 44.8%, at least about 45%, at least about 46%, at least about 50%, at least about 55%, at least about 60%, at least about 65%, at least about 70%, at least about 75%, at least about 80%, at least about 85%, at least about 87%, at least about 88%, at least about 89%, at least about 89.5%, at least about 90%, at least about 91%, at least about 92%, at least about 93%, at least about 94%, at least about 95%, at least about 98%, at least about 99%, or at least about 100% skimmate by volume of the plant fertilizer. In some embodiments, the plant fertilizers disclosed herein can include at most about 25%, at most about 30%, at most about 35%, at most about 40%, at most about 44.8%, at most about 45%, at most about 46%, at most about 50%, at most about 55%, at most about 60%, at most about 65%, at most about 70%, at most about 75%, at most about 80%, at most about 85%, at most about 87%, at most about 88%, at most about 89%, at most about 89.5%, at most about 90%, at most about 91%, at most about 92%, at most about 93%, at most about 94%, at most about 95%, at most about 98%, at most about 99%, or at most about 100% skimmate by volume of the plant fertilizer. In some embodiments, the plant fertilizers disclosed herein can include about 25-100%, about 30-98%, about 35-95%, about 40-95%, about 45-95%, about 46-95%, about 50-95%, about 55-95%, about 60-95%, about 65-95%, about 70-95%, about 75-95%, about 80-95%, about 85-95%, about 87-95%, about 89-94%, about 89-93%, or about 89.5-92% skimmate by volume of the plant fertilizer.

In some embodiments, the plant fertilizers disclosed herein can include at least about 12.5%, at least about 15%, at least about 17.5%, at least about 20%, at least about 22.4%, at least about 22.5%, at least about 23%, at least about 25%, at least about 27.5%, at least about 30%, at least about 32.5%, at least about 35%, at least about 37.5%, at least about 40%, at least about 42.5%, at least about 43.5%, at least about 44%, at least about 44.5%, at least about 44.75%, at least about 45%, at least about 45.5%, at least about 46%, at least about 46.5%, at least about 47%, at least about 47.5%, at least about 49%, at least about 49.5%, or at least about 50% skimmate by volume of the plant fertilizer. In some embodiments, the plant fertilizers disclosed herein can include at most about 12.5%, at most about 15%, at most about 17.5%, at most about 20%, at most about 22.4%, at most about 22.5%, at most about 23%, at most about 25%, at most about 27.5%, at most about 30%, at most about 32.5%, at most about 35%, at most about 37.5%, at most about 40%, at most about 42.5%, at most about 43.5%, at most about 44%, at most about 44.5%, at most about 44.75%, at most about 45%, at most about 45.5%, at most about 46%, at most about 46.5%, at most about 47%, at most about 47.5%, at most about 49%, at most about 49.5%, or at most about 50% skimmate by volume of the plant fertilizer. In some embodiments, the plant fertilizers disclosed herein can include about 12.5-50%, about 15-49%, about 17.5-47.5%, about 20-47.5%, about 22.5-47.5%, about 23-47.5%, about 25-47.5%, about 24.5-47.5%, about 30-47.5%, about 32.5-47.5%, about 35-47.5%, about 37.5-47.5%, about 40-47.5%, about 42.5-47.5%, about 43.5-47.5%, about 44.5-47%, about 44.5-46.5%, or about 44.75-46% skimmate by volume of the plant fertilizer.

Furthermore, during the harvesting process of the skimmate, live bacteria from the reduced sodium, artificial ocean water environment may also be reclaimed along with the skimmate. These bacteria in the skimmate can be part of the fertilizer composition and may assist in delivering nutrients to the plants.

Any of a number of suitable additives may be mixed with the skimmate. An additive may be mixed with the skimmate (e.g., the liquids, the solids or both) for the purpose of increasing the elemental concentration of one or more chemical elements (e.g., nitrogen, silicon, phosphorus, calcium, potassium, iodine, or otherwise). An additive may be mixed with the skimmate for the purpose of increasing the concentration of one or more chemical compounds (e.g., a phosphate). An additive may be employed for enhancing mixing, for enhancing solubility and/or for enhancing the ability to disperse of the skimmate (or one or more of its constituents, e.g., fish excrement) when it is later used as a fertilizer. An additive may be employed for enhancing the diffusion of the skimmate (or one or more of its constituents, e.g., fish excrement) across a membrane, when it is later used as a fertilizer. An additive may also be employed for introducing at least one predetermined organic functionality (e.g., an aromatic group, such as a phenolic group, a carboxylic group, or both) into a mixture that includes the skimmate. An additive may be employed for altering the pH of the skimmate. Another additive that may be employed is fish emulsion, which is used as a source of phosphorus and nitrogen.

It is possible that the above additives may be provided in combination (e.g., as chemical compounds). Any of the silicon, phosphorus or potassium sources may be provided as a compound. They may be provided in a solid form. They may also be provided at least partially dissolved in a solution. For example, it is possible that additives may be provided or employed in their ionic form. For example, potassium silicate may be provided as a source of both potassium and silicon. To this end, potassium and silicon may be provided in a soluble powder form (which may include an elemental form of potassium, silicon or both, or a compound form of either or both). An example of a commercially available material is Silica Earth® Volcanic Silica Minerals. Such a material may be employed in an amount of about 5 to about 500 milligrams (mg) per liter (about 100 milligrams (mg) per liter) of skimmate. The additives may be certified as organic. Some additives may be premixed with skimmate and some may be provided separately for end users to mix.

As discussed above, the plant fertilizers disclosed herein can include a source of potassium. In some embodiments, the source of potassium is an *Ascophyllum nodosum* or an organic *Ascophyllum nodosum* such as Maxicrop Soluble Seaweed Powder. In some embodiments, the plant fertilizers disclosed herein can include at least about 2 g/L, at least about 5 g/L, at least about 8 g/L, at least about 10 g/L, at least about 15 g/L, at least about 18 g/L, at least about 20 g/L, at least about 21 g/L, at least about 23 g/L, at least about 25 g/L, at least about 30 g/L, at least about 35 g/L, at least about 38 g/L, at least about 40 g/L, at least about 42 g/L, or at least about 40 g/L of the source of potassium. In some embodiments, the plant fertilizers disclosed herein can include at most about 90 g/L, at most about 88 g/L, at most about 85 g/L, at most about 84 g/L, at most about 83 g/L, at most about 80 g/L, at most about 75 g/L, at most about 70 g/L, at most about 65 g/L, at most about 60 g/L, at most about 55 g/L, at most about 50 g/L, at most about 45 g/L, at most about 40 g/L, at most about 35 g/L, at most about 30 g/L, at most about 25 g/L, at most about 21 g/L, at most about 20 g/L, or at most about 18 g/L of the source of potassium. In some embodiments, the plant fertilizers disclosed herein can include about 2-25 g/L, about 5-20 g/L, about 5-15 g/L, about 8-12 g/L, or about 10 g/L the source of potassium. In some embodiments, the plant fertilizers disclosed herein can include about 10-40 g/L, about 15-35 g/L, about 15-30 g/L, about 15-25 g/L, about 18-22 g/L, or about 20 g/L the source of potassium. In some embodiments, the plant fertilizers disclosed herein can include about 21-84 g/L, about 25-80 g/L, about 30-70 g/L, about 30-65 g/L, about 35-60 g/L, about 35-55 g/L, about 35-50 g/L, about 35-45 g/L, about 38-42 g/L, or about 40 g/L the source of potassium.

As discussed above, the plant fertilizers disclosed herein can include a source of silicon. The source of silicon can strengthen the stalks of plants. In some embodiments, the source of silicon is an organic source of silicon. In some embodiments, the organic source of silicon is Silica Earth Volcanic Silica Minerals. In some embodiments, the plant fertilizers disclosed herein can include at least about 0.1%, at least about 0.2%, at least about 0.25%, at least about 0.3%, at least about 0.4%, at least about 0.5%, at least about 0.6%, at least about 0.7%, at least about 0.8%, at least about 0.9%, at least about 1% the source of silicon by volume of the plant fertilizer. In some embodiments, the plant fertilizers disclosed herein can include at most about 0.1%, at most about 0.2%, at most about 0.25%, at most about 0.3%, at most about 0.4%, at most about 0.5%, at most about 0.6%, at most about 0.7%, at most about 0.8%, at most about 0.9%, at most about 1% the source of silicon by volume of the plant fertilizer. In some embodiments, the plant fertilizers disclosed herein can include about 0.1-1%, about 0.2-0.8%, about 0.3-0.5%, or about 0.1-0.4% the source of silicon by volume of the plant fertilizer. In some embodiments, the source of silicon can be a solution having a concentration of about 20-100 g/L of silicon.

As discussed above, the plant fertilizers disclosed herein can include a pH adjusting agent. The pH adjusting agent can prevent the bottles from bloating. In some embodiments, the pH adjusting agent is an acidic pH adjusting agent. In some embodiments, the pH adjusting agent is an organic pH adjusting agent. In some embodiments, the pH adjusting agent is a pH reducing agent. In some embodiments, the pH reducing agent is SafeGro® pH Down pH Adjuster—Complexing Agent. In some embodiments, the plant fertilizers disclosed herein can include at least about 0.05%, at least about 0.1%, at least about 0.2%, at least about 0.25%, at least about 0.3%, at least about 0.4%, at least about 0.5%, at least about 0.6%, at least about 0.7%, at least about 0.8%, at least about 0.9%, at least about 0.1% the pH adjusting agent by volume of the plant fertilizer. In some embodiments, the plant fertilizers disclosed herein can include at most about 0.1%, at most about 0.2%, at most about 0.25%, at most about 0.3%, at most about 0.4%, at most about 0.5%, at most about 0.6%, at most about 0.7%, at most about 0.8%, at most about 0.9%, at most about 1% the pH adjusting agent by volume of the plant fertilizer. In some embodiments, the plant fertilizers disclosed herein can include about 0.05-0.2%, about 0.1-1%, about 0.2-0.8%, about 0.3-0.5%, or about 0.1-0.4% the pH adjusting agent by volume of the plant fertilizer.

As discussed above, the plant fertilizers disclosed herein can include at least one microorganism. In some embodiments, the plant fertilizers can include a root growth enhancer. The root growth enhancer can help the plants develop an expansive root system, improve nutrient cycling and soil structure. In addition the root growth enhancer can protect against a variety of plant stresses. In some embodiments, the root growth enhancer comprises at least one microorganism. In some embodiments, the at least one microorganism is a fungi. In some embodiments, the fungi can be endomycorrhizal fungi, ectomycorrhizal fungi, or a combination thereof. In some embodiments, the root growth enhancer can include humic acids. In some embodiments, the root growth enhancer can be Down to Earth Soluble Root Growth Enhancer Mycorrhizal Fungi. In some embodiments, the plant fertilizers disclosed herein can include at least about 7.5 g/L, at least about 10 g/L, at least about 12.5 g/L, at least about 15 g/L, at least about 29 g/L, at least about 25 g/L, at least about 30 g/L, at least about 35 g/L, at least about 40 g/L, at least about 50 g/L, at least about 55 g/L, at least about 60 g/L, at least about 65 g/L, at least about 70 g/L, or at least about 75 g/L of a root growth enhancer. In some embodiments, the plant fertilizers disclosed herein can include at most about 125 g/L, at most about 120 g/L, at most about 110 g/L, at most about 100 g/L, at most about 90 g/L, at most about 80 g/L, at most about 75 g/L, at most about 70 g/L, at most about 60 g/L, at most about 50 g/L, at most about 45 g/L, at most about 40 g/L, at most about 35 g/L, at most about 30 g/L, at most about 25 g/L, at most about 20 g/L, or at most about 15 g/L of a root growth enhancer.

As discussed above, the plant fertilizers disclosed herein can include a source of nitrogen and/or a source of phosphorus. In some embodiments, the plant fertilizers disclosed herein can include a source of phosphorus and nitrogen. In some embodiments, the source of phosphorus and nitrogen can include hydrolyzed fish scraps, kelp, and/or Chilean nitrate. In some embodiments, the source of phosphorus and nitrogen can be an organic source of nitrogen and phosphorus. In some embodiments, the source of phosphorus and nitrogen can be Dramm One by the Dramm Corporation. In some embodiments, the plant fertilizers disclosed herein can include at least about 9%, at least about 10%, at least about 15%, at least about 18%, at least about 18.7%, at least about 20%, at least about 25%, at least about 25.6%, at least about 30%, at least about 35%, at least about 36%, at least about 37.4%, at least about 40%, at least about 45%, at least about 50%, or at least about 51.2% a source of nitrogen and/or phosphorus by volume of the plant fertilizer. In some embodiments, the plant fertilizers disclosed herein can include at most about 100%, at most about 90%, at most about 80%, at most about 75%, at most about 74.8%, at most about 65%, at most about 55%, at most about 51.2%, at most about 50%, at most about 45%, at most about 40%, at most about 37.4%, at most about 36%, at most about 30%, at most about 25%, at most about 20%, or at most about 18% a source of nitrogen and/or phosphorus by volume of the plant fertilizer.

In some embodiments, the plant fertilizers disclosed herein can include water. In some embodiments, the water can be deionized and/or reverse osmosis water. In some embodiments, the water can go through a 6 stage filtration process to remove all or most dissolved solids. In some embodiments, the water can be used to dilute the concentration of the source of nitrogen and/or phosphorus. In some embodiments, the plant fertilizers disclosed herein can include at least about 20%, at least about 24.4%, at least about 25%, at least about 30%, at least about 31.3%, at least about 35%, at least about 40%, at least about 45%, at least about 48.8%, at least about 50%, at least about 55%, at least about 60%, or at least about 62.6% water by volume of the plant fertilizer. In some embodiments, the plant fertilizers disclosed herein can include at most about 100%, at most about 90%, at most about 80%, at most about 70%, at most about 65%, at most about 62.6%, at most about 60%, at most about 55%, at most about 50%, at most about 48.8%, at most about 45%, at most about 40%, or at most about 40% water by volume of the plant fertilizer.

In some embodiments, the amount of sodium in the plant fertilizer can be less than about 2500 mg/L, less than about 2000 mg/L, less than about 1500 mg/L, less than about 1100 mg/L, 1000 mg/L sodium, less than about 750 mg/L sodium, less than about 500 mg/L sodium, less than about 250 mg/L sodium, less than about 75 mg/L sodium, less than about 50 mg/L sodium, less than about 25 mg/L sodium and more preferably 0 mg/L of sodium. In some embodiments, the sodium in the plant fertilizer can be about less than about 0.19%, less than about 1.55%, less than about 0.24%, less than about 2.02%, less than about 0.48%, less than about 1.88%, less than about 0.07%, or less than about 0.11% based on a Guaranteed Analysis using the Fertilizer Secondary and Micronutrient Analytical Methods Manual and Official Methods of Analysis of AOAC International.

In some embodiments, the amount of calcium in the skimmate can be about 0.01-0.2%, about 0.01-0.1%, or about 0.06%. In some embodiments, the amount of magnesium in the skimmate can be about 0.1-0.3%, about 0.15-0.25%, or about 0.21%. In some embodiments, the total nitrogen in the skimmate can be about 0.03-0.07%, about 0.04-0.06%, about 0.045-0.055%, or about 0.05%. In some embodiments, the amount of available phosphorus (as $P_2O_5$) in the skimmate can be about 0.01-0.03%, about 0.015-0.025%, or about 0.023%. In some embodiments, the amount of potassium (as $K_2O$) in the skimmate can be about 0.07-0.11%, about 0.08-0.1%, about 0.085-0.095%, or about 0.09%. The amounts in this paragraph are based on a Guaranteed Analysis using the Fertilizer Secondary and Micronutrient Analytical Methods Manual and Official Methods of Analysis of AOAC International.

In some embodiments, the amount of calcium in the plant fertilizer can be about 0.3-0.7%, about 0.4-0.6%, about 0.4-0.5%, or about 0.47%. In some embodiments, the amount of magnesium in the plant fertilizer can be about 0.1-0.3%, about 0.15-0.25%, or about 0.21%. In some embodiments, the total nitrogen in the plant fertilizer can be about 0.01-0.2%, about 0.05-0.15%, or about 0.119%. In some embodiments, the amount of available phosphorus (as $P_2O_5$) in the plant fertilizer can be about 0.15-0.19%, about 0.16-0.18%, or about 0.169%. In some embodiments, the amount of potassium (as $K_2O$) in the plant fertilizer can be about 0.6-1%, about 0.7-0.95%, about 0.8-0.9%, or about 0.849%. In some embodiments, the amount of sulfur in the plant fertilizer can be about 0.2-0.6%, about 0.3-0.5%, or about 0.41%. The amounts in this paragraph are based on a Guaranteed Analysis using the Fertilizer Secondary and Micronutrient Analytical Methods Manual and Official Methods of Analysis of AOAC International.

In some embodiments, the amount of calcium in the plant fertilizer can be about 0.5-0.9%, about 0.6-0.8%, about 0.6-0.7%, or about 0.68%. In some embodiments, the amount of magnesium in the plant fertilizer can be about 0.01-0.03% or about 0.02%. In some embodiments, the total nitrogen in the plant fertilizer can be about 1-3%, about 2-3%, or about 2.45%. In some embodiments, the amount of available phosphorus (as $P_2O_5$) in the plant fertilizer can be about 1-5%, about 2-4%, or about 3.37%. In some embodiments, the amount of potassium (as $K_2O$) in the plant fertilizer can be about 0.05-0.09%, about 0.06-0.08%, about 0.06-0.07%, or about 0.065%. In some embodiments, the amount of sulfur in the plant fertilizer can be less than about 0.1%. The amounts in this paragraph are based on a Guaranteed Analysis using the Fertilizer Secondary and Micronutrient Analytical Methods Manual and Official Methods of Analysis of AOAC International.

In some embodiments, the amount of calcium in the plant fertilizer can be about 0.1-0.5%, about 0.2-0.4%, or about 0.31%. In some embodiments, the amount of magnesium in the plant fertilizer can be about 0.1-0.3%, about 0.1-0.25%, or about 0.17%. In some embodiments, the total nitrogen in the plant fertilizer can be about 0.01-0.2%, about 0.05-0.15%, or about 0.089%. In some embodiments, the amount of available phosphorus (as $P_2O_5$) in the plant fertilizer can be about 0.2-0.6%, about 0.3-0.5%, or about 0.421%. In some embodiments, the amount of potassium (as $K_2O$) in the plant fertilizer can be about 0.5-1%, about 0.6-0.9%, about 0.6-0.8%, or about 0.7%. In some embodiments, the amount of sulfur in the plant fertilizer can be about 0.05-0.3%, about 0.1-0.2%, or about 0.17%. The amounts in this paragraph are based on a Guaranteed Analysis using the Fertilizer Secondary and Micronutrient Analytical Methods Manual and Official Methods of Analysis of AOAC International.

In some embodiments, the amount of calcium in the plant fertilizer can be about 0.4-0.8%, about 0.5-0.7%, about 0.5-0.6%, or about 0.58%. In some embodiments, the amount of magnesium in the plant fertilizer can be about 0.005-0.02% or about 0.01%. In some embodiments, the total nitrogen in the plant fertilizer can be about 1-3%, about 1-2%, or about 1.93%. In some embodiments, the amount of available phosphorus (as $P_2O_5$) in the plant fertilizer can be about 1-5%, about 2-4%, or about 2.69%. In some embodiments, the amount of potassium (as $K_2O$) in the plant fertilizer can be about 0.5-0.9%, about 0.6-0.8%, about 0.06-0.7%, or about 0.608%. In some embodiments, the amount of sulfur in the plant fertilizer can be less than about 0.1%. The amounts in this paragraph are based on a Guaranteed Analysis using the Fertilizer Secondary and Micronutrient Analytical Methods Manual and Official Methods of Analysis of AOAC International.

In some embodiments, the amount of calcium in the plant fertilizer can be about 0.2-0.6%, about 0.4-0.6%, or about 0.47%. In some embodiments, the amount of magnesium in the plant fertilizer can be about 0.1-0.4%, about 0.2-0.3%, or about 0.29%. In some embodiments, the total nitrogen in the plant fertilizer can be about 0.05-0.3%, about 0.05-0.2%, or about 0.136%. In some embodiments, the amount of available phosphorus (as $P_2O_5$) in the plant fertilizer can be about 0.05-0.3%, about 0.05-0.2%, or about 0.151%. In some embodiments, the amount of potassium (as $K_2O$) in the plant fertilizer can be about 0.3-0.7%, about 0.4-0.6%, about 0.5-0.6%, or about 0.56%. In some embodiments, the amount of sulfur in the plant fertilizer can be about 0.05-0.3%, about 0.1-0.2%, or about 0.14%. The amounts in this paragraph are based on a Guaranteed Analysis using the Fertilizer Secondary and Micronutrient Analytical Methods Manual and Official Methods of Analysis of AOAC International.

In some embodiments, the amount of calcium in the plant fertilizer can be about 0.5-0.9%, about 0.6-0.8%, about 0.7-0.8%, or about 0.71%. In some embodiments, the amount of magnesium in the plant fertilizer can be about 0.02-0.04% or about 0.03%. In some embodiments, the total nitrogen in the plant fertilizer can be about 1-3%, about 1-2%, or about 1.66%. In some embodiments, the amount of available phosphorus (as $P_2O_5$) in the plant fertilizer can be about 1-3%, about 1-2%, or about 1.46%. In some embodiments, the amount of potassium (as $K_2O$) in the plant fertilizer can be about 0.1-0.4%, about 0.1-0.3%, about 0.15-0.3%, or about 0.222%. In some embodiments, the amount of sulfur in the plant fertilizer can be less than about 0.1%. The amounts in this paragraph are based on a Guaranteed Analysis using the Fertilizer Secondary and Micronutrient Analytical Methods Manual and Official Methods of Analysis of AOAC International.

In some embodiments and as discussed herein further, the ingredients of the plant fertilizers can be split into multiple bottles to be combined prior to being added to the soil (as explained below). As such, the above ranges can encompass a single bottle that includes some but not all ingredients as well as the combination of bottles that includes all the ingredients of the plant fertilizers.

It is contemplated to have differing formulations of fertilizer depending on the plant type and the life cycle stage the plant is in (vegetative stage and bloom or flowering/fruiting stage). It is also contemplated to have a fertilizer formulation used as a sweetener as described herein. Also, it is contemplated to have a fertilizer formulation for plant cloning (plant cutting or striking) to asexually propagate plants. A still further formulation of the improved fertilizer utilizing the skimmate of the present invention may be contemplated for use as a universal fertilizer, independent of the growth stage of the plant. It is further contemplated that the fertilizer composition may be divided into two or more sub-formulations that can be packaged separately. Preferably the improved fertilizer is provided in two (2) separate recipes that are mixed into a water reservoir or watering can prior to application to the plants.

An example of the embodiment of a fertilizer formulation for the vegetative stage of a plant's life cycle may include two (2) bottles, each of a 1 liter (L) capacity. Each bottle contains a distinct formula and when combined with the other bottle into a reservoir of water or watering can the improved fertilizer may be applied to the plants. Bottle 1 may contain 20.5 grams (g) of a source of potassium (possibly derived from Norwegian seaweed (*Ascophyllum nodosum*), such as Maxicrop® Soluble Seaweed Powder, or similar commercially available, preferably certified organic product), 30 grams (g) of a soluble root growth enhancement powder (possibly derived from Mycorrhizal Fungi and humic acids derived from Leonardite, such as Down To Earth® Soluble Root Growth Enhancer Mycorrhizal Fungi, or similar commercially available, preferably certified organic product), 920 milliliter (ml) of skimmate of the present invention, 4 milliliters (ml) of a source of silicon (possibly derived from volcanic minerals or naturally occurring sand, such as Silica Earth® Volcanic Silica Minerals, or similar commercially available, preferably certified organic product), an amount between zero and 33 milliliters (ml) of an enzymatic formula, such as commercially available SLF-100 (a bacteria that stimulates the uptake of nitrogen by plant roots), an amount between zero and 4.75 milliliters (ml) of a bacteria, such as commercially available Mammoth P, used to stimulate the uptake of phosphorus by plant roots, and 1.5 milliliters (ml) of a source of acid (possibly phosphoric acid or citric acid, either synthetic or derived from SaferGro® pH Down pH Adjuster—Complexing Agent, or similar commercially available, preferably certified organic product) to control the pH level. These ingredients could be mixed together fully, ideally in a 'clean' room, in a suitably sized container such as a clean 55-gallon garbage can, the solid components being added slowly at a constant rate while the liquid (the skimmate) is being mixed using a hand-held electric tool or commercial mixing apparatus. The pH balancing to pH4.2-pH4.5 would be done as the final preparation step. This mixture can then be pumped from the container into a variety of sizes of bottles, buckets and totes for distribution.

Bottle 2 may contain 374 milliliters (ml) of a source of nitrogen and phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), and 620 milliliters (ml) of RO/DI water. The water is distilled, purified, deionized (e.g., by reverse osmosis de-ionization) or any combination thereof. These ingredients could be mixed together fully, ideally in a 'clean' room, in a suitably sized container such as a clean 55-gallon garbage can, the liquid components being mixed using a hand-held electric tool or commercial mixing apparatus. This mixture can then be pumped from the container into a variety of sizes of bottles, buckets and totes for distribution.

An example of the embodiment of a fertilizer formulation for the bloom, flowering or fruiting stage of a plant's life cycle may include either two (2) or optionally three (3) bottles, each of a 1 liter (1 L) capacity. Each bottle contains a distinct formula and when combined with the other bottle into a reservoir of water or watering can the improved fertilizer may be applied to the plants. Bottle 1 may contain 42 grams (g) of a source of potassium (possibly derived from Norwegian seaweed (*Ascophyllum nodosum*), such as Maxicrop® Soluble Seaweed Powder, or similar commercially available, preferably certified organic product), 920 milliliters (ml) of skimmate of the present invention, 5 milliliters (ml) of a source of silicon (possibly derived from volcanic minerals or naturally occurring sand, such as Silica Earth® Volcanic Silica Minerals, or similar commercially available, preferably certified organic product), an amount between zero and 30 milliliters (ml) of an enzymatic formula, such as commercially available SLF-100 (a bacteria that stimulates the uptake of nitrogen by plant roots), an amount between zero and 7.25 milliliters (ml) of a bacteria, such as commercially available Mammoth P, used to stimulate the uptake of phosphorus by plant roots, and 5 milliliters (ml) of a source of acid (possibly phosphoric acid or citric acid, either synthetic or derived from SaferGro® pH Down pH Adjuster—Complexing Agent, or similar commercially available, preferably certified organic product) to control the pH level. These ingredients could be mixed together fully, ideally in a 'clean' room, in a suitably sized container such as a clean 55-gallon garbage can, the solid components being added slowly at a constant rate while the liquid (the skimmate) is being mixed using a hand-held electric tool or commercial mixing apparatus. The pH balancing to pH4.2-pH4.5 would be done as the final preparation step. This mixture can then be pumped from the container into a variety of sizes of bottles, buckets and totes for distribution.

Bottle 2 may contain 512 milliliters (ml) of a source of nitrogen and phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), and 476 milliliters (ml) of RO/DI water. These ingredients could be mixed together fully, ideally in a 'clean' room, in a suitably sized container such as a clean 55-gallon garbage can, the liquid components being mixed using a hand-held electric tool or commercial mixing apparatus. This mixture can then be pumped from the container into a variety of sizes of bottles, buckets and totes for distribution.

Optional bottle 3: In some embodiments, the plant fertilizer disclosed herein can be a sweetener composition. The sweetener composition can help feed soil borne microorganisms and/or help improve taste of fruits, buds, etc. The sweetener can include various sugar sources including, but not limited to, date syrup (e.g., Date Lady Organic Pure Date Syrup), yacon syrup (e.g., Jedwards International, Inc. Yacon Syrup—organic), agave nectar (e.g., Jedwards International, Inc. Agave Nectar Raw—organic), coconut sugar (e.g., Jedwards International, Inc. Honey—Coconut sugar—organic), honey (e.g., Jedwards International Inc. Honey—Raw—Organic Fair trade), molasses (e.g., Golden Barrel Organic Blackstrap Molasses), sorghum syrup (e.g., Pure Sorghum Syrup by Muddy Pond Sorghum Mill), and/or muscovado sugar (e.g., India Tree Light Muscovado Sugar). In some embodiments, the sugar sources are all-natural and/or organic sugar sources. In some embodiments, the sweetener can include about 12.5-50 g/L, about 15-40 g/L, about 20-30 g/L, about 22-28 g/L, about 24-26 g/L, or about 25 g/L of a sugar source. The above ranges for the sugar sources can also apply to each individual sugar source in the sweetener. In some embodiments, the sweetener can also include potassium metabisulfite which can help prevent fermentation. In some embodiments, the sweetener can include about 1-3 g/L, about 1-2 g/L, or about 1.5 g/L potassium metabisulfite. In some embodiments, the sweetener can include a pH adjusting agent. In some embodiments, the pH adjusting agent is a pH reducing agent. In some embodiments, the pH reducing agent is SafeGro® pH Down pH Adjuster—Complexing Agent. In some embodiments, the sweetener can include about 0.05-0.2%, about 0.05-0.15%, or about 0.1% the pH adjusting agent by volume of the sweetener. In some embodiments, the sweetener can include water. In some embodiments, the water can be deionized and/or reverse osmosis water. In some embodiments, the water can go through a 6 stage filtration process to remove all dissolved solids. In some embodiments, the water can be used to dilute the concentration of the sugar sources. In some embodiments, the sweetener can include about 42.5-100%, about 50-95%, about 60-95%, about 70-95%, about 80-90%, or about 85% water by volume of the sweetener.

In some embodiments, the amount of calcium in the sweetener can be about 0.05-0.3%, about 0.05-0.2%, about 0.05-0.15%, or about 0.1%. In some embodiments, the amount of magnesium in the sweetener can be about 0.005-0.02% or about 0.01%. In some embodiments, the total nitrogen in the sweetener can be about 0.02-0.06%, about 0.03-0.05%, or about 0.041%. In some embodiments, the amount of available phosphorus (as $P_2O_5$) in the sweetener can be about 0.02-0.06%, about 0.03-0.05%, or about 0.043%. In some embodiments, the amount of potassium (as $K_2O$) in the plant fertilizer can be about 0.1-0.4%, about 0.1-0.3%, about 0.15-0.3%, or about 0.194%. In some embodiments, the amount of sulfur in the plant fertilizer can be less than about 0.1%. The amounts in this paragraph are based on a Guaranteed Analysis using the Fertilizer Secondary and Micronutrient Analytical Methods Manual and Official Methods of Analysis of AOAC International.

Bottle 3 may contain 25 grams (g) of each of the following all-natural and/or organic sugar sources: honey, agave nectar, sorghum syrup, yacon syrup, coconut sugar, muscovado sugar, date syrup, and molasses; 850 milliliters (ml) of RO/DI water, some amount between 0.05 and 1.6 grams (g) of potassium metabisulfite (to prevent fermentation), and 0.75 milliliters (ml) of a source of acid (possibly phosphoric acid or citric acid, either synthetic or derived from Safer-Gro® pH Down pH Adjuster—Complexing Agent, or similar commercially available, preferably certified organic product) to control the pH level. The water is distilled, purified, deionized (e.g., by reverse osmosis de-ionization) or any combination thereof. These ingredients could be mixed together fully, ideally in a 'clean' room, in a suitably sized container such as a clean 55-gallon garbage can, the sugars being added first, then hot RODI water (at a temperature of between 140 F and 160 F) being mixed in using a hand-held electric tool or commercial mixing apparatus. The fermentation preservative should be dissolved in a small amount of hot RODI prior to being added to the container. The pH balancing to pH4.2-pH4.5 would be done as the final preparation step. This mixture can then be pumped from the container into a variety of sizes of bottles, buckets and totes for distribution, said receptacles being rated to withstand liquids of temperatures up to at least 160 F.

A fertilizer composition for use with plant cloning may comprise some of the same ingredients described above for the vegetative stage of a plant's life cycle. Furthermore, the plant cloning fertilizer composition may contain a thickener, stabilizer and/or gelling agent, such that the fertilizer can be directly administered to the stem of the cut plant prior to planting. The thickener, stabilizer and/or gelling agent may be selected from categories of polysaccharides (starches such as arrowroot, cornstarch, potato starch, vegetable gums such as guar gum, xanthan gum and locust bean gum), protein (collagen, egg whites, gelatin, whey), and sugars (agar, carrageenan). The concentration level of the cloning fertilizer recipe may be lower than that of the vegetative stage fertilizer composition.

In some embodiments, the plant fertilizers disclosed herein can also include a gelling agent. The gelling agent can increase viscosity of the plant fertilizer. In some embodiments, the gelling agent is xantham gum (e.g., Anthony's Premium Xantham gum). In some embodiments, the plant fertilizer can include about 5-10 g/L, about 6-9 g/L, about 7-8 g/L, or about 7.5 g/L of a gelling agent. In some embodiments, the plant fertilizers disclosed herein can also include a rooting hormone to encourage plant rooting. In some embodiments, the rooting hormone can be indole-3-butyric acid. In some embodiments, plant fertilizers can include about 0.1-0.5 g/L, about 0.1-0.4 g/L, about 0.1-0.3 g/L, or about 0.2 g/L of a rooting hormone. In some embodiments, the plant fertilizers disclosed herein can include a fungicide that can help prevent mold. In some embodiments, the fungicide is lysozyme. In some embodiments, the plant fertilizers can include about 0.1-0.5 g/L, about 0.1-0.4 g/L, about 0.1-0.3 g/L, or about 0.2 g/L a fungicide. In some embodiments, the plant fertilizer disclosed herein can include smell masking agent to improve the smell. In some embodiments, the smell masking agent is peppermint oil. In some embodiments, the plant fertilizers disclosed herein can include about 0.1-0.4%, about 0.1-0.3%, or about 0.2% smell masking agent by volume of the plant fertilizer. In some embodiments, the plant fertilizers disclosed herein can include a moisture adding agent. In some embodiments, the moisture adding agent is aloe vera gel. In some embodiments, the plant fertilizers disclosed herein can include about 1-4%, about 1-3%, or about 2% moisture adding agent by volume of the plant fertilizer.

An example of the embodiment of a fertilizer formulation for the clone stage of a plant's life cycle may include a gel product in a 500 milliliter (ml) capacity bottle. This bottle may contain 5.125 grams (g) of a source of potassium (possibly derived from Norwegian seaweed (*Ascophyllum nodosum*), such as Maxicrop® Soluble Seaweed Powder, or similar commercially available, preferably certified organic product), 7.5 grams (g) of a soluble root growth enhancement powder (possibly derived from Mycorrhizal Fungi and humic acids derived from Leonardite, such as Down To Earth® Soluble Root Growth Enhancer Mycorrhizal Fungi, or similar commercially available, preferably certified organic product), 213 milliliters (ml) of skimmate of the present invention, 1 milliliter (ml) of a source of silicon (possibly derived from volcanic minerals or naturally occurring sand, such as Silica Earth® Volcanic Silica Minerals, or similar commercially available, preferably certified organic product), an amount between zero and 8.25 milliliters (ml) of an enzymatic formula, such as commercially available SLF-100 (a bacteria that stimulates the uptake of nitrogen by plant roots), an amount between zero and 1.1875 milliliters (ml) of a bacteria, such as commercially available Mammoth P, used to stimulate the uptake of phosphorus by plant roots, 93.5 milliliters (ml) of a source of nitrogen and phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), 141.25 milliliters (ml) of RO/DI water, some amount between 1 gram and 5 grams of a gelling agent (possibly derived from xantham gum, such as Anthony's Premium Xanthan Gum or similar commercially available, preferably certified organic product), some amount between 5 ppm and 100 ppm of a root growth hormone such as indole-3-butyric acid, 10 milliliters (ml) of organic aloe vera gel, some amount between 5 ppm and 100 ppm of Lysozyme (to prevent mold) and 1 ml of an aromatic essential oil, such as peppermint, eucalyptus, or tea tree, to improve smell. The water is distilled, purified, deionized (e.g., by reverse osmosis de-ionization) or any combination thereof. These ingredients could be mixed together fully, ideally in a 'clean' room, in a suitably sized container such as a clean 55-gallon garbage can, the liquid components being mixed using a hand-held electric tool or commercial mixing apparatus. The pH balancing to pH6.3-pH6.5 would be done as the penultimate preparation step—the final step being the addition of the thickening agent. This thickening agent could be added at a slow, constant rate and mixed using a hand-held electric tool or commercial mixing apparatus. This mixture can then be pumped immediately from the container into a variety of sizes of bottles, buckets and totes for distribution. Note that the liquid will start to gel almost as soon as the thickening agent is added.

An example of the embodiment of a fertilizer formulation for use as a universal fertilizer, independent of the growth stage of the plant, may include two (2) bottles, each of a 1 liter (1 L) capacity. Bottle 1 may contain 42 grams (g) of seaweed powder, some amount between 25 grams and 75 grams of a soluble root growth enhancement powder (possibly derived from Mycorrhizal Fungi and humic acids derived from Leonardite, such as Down To Earth® Soluble Root Growth Enhancer Mycorrhizal Fungi, or similar commercially available, preferably certified organic product), 895 milliliters (ml) of skimmate of the present invention, 5 milliliters (ml) of a solution of a source of silicon (possibly derived from volcanic minerals or naturally occurring sand, such as Silica Earth® Volcanic Silica Minerals, or similar commercially available, preferably certified organic product), and 4 milliliters (ml) of a source of acid (possibly phosphoric acid or citric acid, either synthetic or derived from SaferGro® pH Down pH Adjuster—Complexing Agent, or similar commercially available, preferably certified organic product) to control the pH level. These ingredients could be mixed together fully, ideally in a 'clean' room, in a suitably sized container such as a clean 55-gallon garbage can, the solid components being added slowly at a constant rate while the liquid (the skimmate) is being mixed using a hand-held electric tool or commercial mixing apparatus. The pH balancing to pH4.2-pH4.5 would be done as the final preparation step. This mixture can then be pumped from the container into a variety of sizes of bottles, buckets and totes for distribution.

Bottle 2 may contain 512 milliliters (ml) of a source of nitrogen and phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), and 430 milliliters (ml) of RO/DI water. The water is distilled, purified, deionized (e.g., by reverse osmosis de-ionization) or any combination thereof. These ingredients could be mixed together fully, ideally in a 'clean' room, in a suitably sized container such as a clean 55-gallon garbage can, the liquid components being mixed using a hand-held electric tool or commercial mixing apparatus. This mixture can then be pumped from the container into a variety of sizes of bottles, buckets and totes for distribution.

The process for mixing theses fertilizer bottles may include; the construction of a "clean room" (a sealed environment with filtered+recycled air, and controlled temperature) to prevent the contamination of one bottle with another; the sterilizing of the plastic jugs using RODI water or steam heated to at least 160 F; the mixing of each bottle's ingredients in a 35-gallon to 55-gallon garbage can using a motorized paint-stirrer; the optional boiling of the formulation to at least 180 F for 15 minutes—then subsequent cooling to a temperature (such as 100 F) suitable for pumping into plastic jugs; and the bottling of each bottle's formulation using a foot-switch operated pump. During such bottling, the pump may be fitted with a fine mesh filter to trap sediment (such as gypsum (Calcium Sulphate)) and prevent it from entering the bottles.

It is contemplated that other sources of the elements/compounds of the example embodiments of fertilizer formulation may be used.

Any additives may be employed in a total volumetric amount of less than about 75%, less than about 50%, less than about 25% by volume of the total skimmate employed. Any additives may be employed in a total volumetric amount of at least about 0.2%, at least about 0.5%, at least about 1% by volume of the skimmate employed.

One or more steps may be applied to the skimmate after the skimmate is reclaimed from the reservoir but before it is mixed with additives. For example, the concentration of skimmate may be adjusted by removing 10% to 75% of the water, and more preferably removing 50% to 75% of the water either through evaporation or compression. Also, the skimmate may be aerated or circulated by pumping air through it.

The teachings herein contemplate a fertilizer that is made according to the method of the present teachings. Production of the contemplated skimmate-derived fertilizer is not limited to such method. Rather, it is envisioned that the teachings also contemplate fertilizers, skimmate, fish excrement, or other products that have similar compositions as derived from the present method, whether such compositions arise due the present method or some other technique.

A fertilizer according to the present teachings may arise from use of the skimmate of the present teachings, or from another method.

The fertilizer may be employed in a solid form (e.g., a powder or a pellet), a liquid form, a slurry form, a gel form, a paste form, or any combination thereof. The fertilizer may be provided as a concentrate or in a diluted state. The fertilizer may be provided as solution, having been dissolved in a liquid (e.g., water).

It is possible that the fertilizer may be part of a kit that includes plural fertilizer compositions that are, respectively, employed at different stages of plant growth. The compositions of each individual fertilizer of the kit may vary depending upon the intended growth stage.

The teachings herein also relate to a harvestable plant product produced using a fertilizer of the present teachings, and/or using skimmate or fish excrement (either with or without any additive) derived from the method of the present teachings. The harvestable plant product may be selected from a fruit, a vegetable, an herb, a flower, a shrub, or any combination thereof. The harvestable products derived from such plants may include fruits, vegetables, flowers, leaves, buds, stems, stalks, shoots, seeds, roots or otherwise. Specific examples of plants for which the present teachings may have use, such as for increasing plant size (e.g., per unit area or volume of plantable space), and/or plant product yield (e.g., the resulting mass of plant that is harvestable or consumable), as compared with plants that are not treated with the fertilizer (or skimmate) of the present teachings. By way of example, it is envisioned that, as compared with plants that are not treated with the fertilizer (or skimmate) of the present teachings, like plants that are treated using the present teachings (over the same duration of growing period) will exhibit plant size differences and/or plant product yield (e.g., each on the basis of mass per plant) of at least about 5 percent higher, at least about 25 percent higher, at least about 50 percent higher, or at least about 100 percent higher.

For example, it may be assumed that an untreated plant (e.g., a tomato plant) after a predetermined growth period yields a plant that weighs a growth amount (e.g., about one kilogram (kg)) that has a harvestable product amount (e.g., five tomatoes weighing an average of about 0.1 kg each). Use of a fertilizer (or skimmate) of the present teachings, over the same time period and subjected to the same growing conditions (other than use of the fertilizer (or skimmate) is expected to produce a larger plant (e.g., at least about 1.2 kg), and larger amounts of harvestable product (e.g., five tomatoes weighing an average of about 0.12 kg).

Particular examples of plants to which the teachings of the products may include, but not limited to: tomatoes, broccoli, asparagus, cauliflower, cucumbers, legumes, carrots, potatoes, peppers, zucchini, squash, strawberries, raspberries, blueberries, sunflowers, grapes, pumpkins, hemp, *Cannabis*, aloe vera, garlic, lavender, kale, apples, peaches, plums, pears, wheat, lettuce, spinach, basil, barley, rice, corn, soybeans, flowers, trees, bushes, grass (e.g., a sod), grass seed, or otherwise. Thus, the teachings herein contemplate contacting soil, water, and/or a planting (e.g., a seed, a root, a sprout, or other plant part) with an effective amount of the skimmate of the present teachings (and/or a fertilizer including the skimmate of the present teachings). Such "effective amount" may vary from planting to planting. But, typically an amount is effective if it improves (e.g., by at least five percent, twenty five percent or higher) one or any combination of plant characteristics (e.g., yield, growth rate, potency of any medicinal property, flavor, appearance, or otherwise) as compared with a like plant cultivated with no fertilizer.

The following is an illustrative example and is not intended as limiting the scope of the present teachings.

Example 1

A reduced sodium, artificial ocean water as described above is introduced into a reservoir having a volume of about 5,000 liters with a salinity of about 15 parts per thousand. A reactor is located in a filtration unit connected to the reservoir and bacteria is cultivated in the reservoir for a period of ten days. A population of about 10,000 live bearing fish (*Poecilia sphenops* and *Poecilia latipinna* species and/or tilapia) are then introduced into the tank. They are fed about one gram of food organic fish food per 100 fish per day. The fish excrement is collected as skimmate by a protein skimmer. About 200 liters of skimmate per week is reclaimed from the reservoir. An additives package is mixed with the skimmate. The skimmate may constitute between 50 and 80% of the mixture of bottle 1 of each of the vegetative and bloom formulations described herein. The additives package includes a source of nitrogen (possibly derived from hydrolyzed fish scraps, such as Dramm® DRAMMATIC "ONE", Dramm® DRAMMATIC "O", or similar commercially available, preferably certified organic product), a source of phosphorus (possibly derived from hydrolyzed fish scraps, such as Dramm® DRAMMATIC "ONE", Dramm® DRAMMATIC "O", or similar commercially available, preferably certified organic product; possibly derived from steamed bone meal, such as Purely Organic® Purely Phosphorus LQ, or similar commercially available, preferably certified organic product; or a combination thereof), a source of potassium (possibly derived from Norwegian seaweed (*Ascophyllum nodosum*), such as Maxicrop® Soluble Seaweed Powder, or similar commercially available, preferably certified organic product), and a source of silicon (possibly derived from volcanic minerals or naturally occurring sand, such as Silica Earth® Volcanic Silica Minerals, or similar commercially available, preferably certified organic product). The ingredients are mechanically mixed to form a fertilizer mixture.

Example 2

Figure 2:
FIG. 2 is a photograph depicting a comparison of a plant grown in accordance with the present teachings, and one that is grown with a commercially available plant food.

About 20 milliliters of the skimmate of Example 1 is fed to a first kale planting (shown on the left side of FIG. 2) two times during a two month life (from initial seed planting). A commercially available fertilizer (marketed as a plant food) is employed for a second kale planting (from the same seed package) according to its instructions for use. FIG. 2 illustrates growth improvement (both in rate and yield) over the two month growing period for the skimmate-treated planting (left side) as compared with the commercially available fertilizer (shown on right side).

Figure 11:
FIG. 11 is a picture of six sweet pepper plants: three grown with the plant fertilizers disclosed herein (i.e., FOOP) and three grown with Miracle Gro from July 2019.
Figure 12:
FIG. 12 is a picture of six sweet pepper plants: three grown with the plant fertilizers disclosed herein (i.e., FOOP) and three grown with Miracle Gro from August 2019.
Figure 13:
FIG. 13 is a picture of six sweet pepper plants: three grown with the plant fertilizers disclosed herein (i.e., FOOP) and three grown with Miracle Gro from September 2019.

FIGS. 11-13 show the progress of six sweet pepper plants: 3 grown with plant fertilizer disclosed herein and three grown with miracle gro side by side from July through September 2019. Note that the plants grown with the fertilizers disclosed herein are noticeably larger throughout and the last picture (of defoliated plants) shows seven peppers on the plants fertilized with the fertilizers disclosed herein versus the five peppers on the miracle gro plants. These plants were fed 20-50 mL per gallon of water applied each of bottle 1 and bottle 2 of the recipe contemplated in item 115 (universal fertilizer independent of growth stage).

Figure 14:
FIG. 14 is a picture of ten *Cannabis* plants grown side by side with five fed using the plant fertilizer disclosed herein (i.e., FOOP) and five fed using Advanced Nutrients OIM brand fertilizer.

FIG. 14 is a picture that shows ten *Cannabis* plants grown side by side: five fed with plant fertilizers disclosed herein and five fed using advanced nutrients organic brand fertilizer. After just two weeks, the plants grown with the fertilizers disclosed herein (right) were noticeably bushier and larger than the ones on the left. These plants were fed 18-49 mL per gallon of water applied each of bottle 1 and bottle 2 of the recipe contemplated in items 105-106 and 11-36 mL per gallon of water applied each of bottle 1 and bottle 2 of the recipe contemplated in items 107-111 plus 15-40 mL per gallon of water applied of sweetener (bottle 3). The recommended schedule of such feedings is shown in FIG. 16.

Figure 15:
FIG. 15 is a picture of two *Cannabis* plants grown side by side with the plant fertilizer disclosed herein (i.e., FOOP) and one with Down to Earth brand fertilizer.

FIG. 15 is a picture of two *Cannabis* plants grown side by side with the plant fertilizer disclosed herein (i.e., FOOP) and one with down to earth fertilizer. The plant on the left grown with the fertilizers disclosed herein is noticeably larger than the one on the right. The details regarding the feeding of these plants are not known.

General Comments

As seen from the above, the present teachings address generally a reduced sodium, artificial ocean water solution, and a system and process by which reduced sodium skimmate is harvested therefrom and may be mixed with at least one additive for modifying its initial composition for forming a fertilizer composition.

It will be appreciated that the teachings herein contemplate one or more variations within their scope, and the above should not be regarded as limiting. As noted, it is possible that skimmate may be dried, freeze dried, or frozen.

However, it is possible that any of the method teachings herein can be performed in the absence of any drying and/or freezing step. It is possible that skimmate may be heated in the course of preparing a fertilizer. However, it is possible that any of the method teachings herein can be performed in the absence of any heating of skimmate. The compositions and fertilizers of the teachings may be substantially free of any manure of a mammal. Fish may be the sole source of any excrement that is employed in the compositions and fertilizers of the teachings. The methods herein may employ a step of fermenting at least a portion of the skimmate. The compositions and fertilizers of the teachings may include a fermentation product. The compositions and fertilizers of the teachings may include or they may be free of any ash incineration product. The teachings herein may be used in connection with soil based agriculture practices. The teachings herein may be used in connection with hydroponic based hydroculture practices. The teachings may be free of any step of adding a microorganism to any reclaimed skimmate. The teachings may include adding at least one betaine to the skimmate and/or the reduced sodium, artificial ocean water herein. The teachings herein may be devoid of any use of betaine.

While example embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

It is preferred that at least some, or all, of the ingredients that are introduced into the reservoir are organic materials that could be (or have been) certified or otherwise listed as organic, such as by the Organic Materials Review Institute (herein referred to as being certified or certifiable as organic). Desirably, the resulting fertilizer (including its constituent ingredients) likewise, meets the requirement for listing as certified as organic by Organic Materials Review Institute, as existing as of Jun. 1, 2017. However, it is contemplated that the resulting fertilizer does not meet the requirement for listing as certified as organic by Organic Materials Review Institute, as existing as of Jun. 1, 2017.

Unless otherwise stated, the term "fertilizer," as used herein, though described and illustrated in the context of natural ingredients (or ingredients otherwise certified or certifiable as organic) also envisions use of reclaimed skimmate that includes or is used in combination with one or more synthetic ingredients. Unless otherwise noted, the reference to "substantially free of" or "free of" envisions the presence of incidental amounts of an ingredient not otherwise intended to be part of a composition.

Relative quantities herein are expressed are by weight unless otherwise stated.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight, and vice versa. Thus, an expression in the Detailed Description of the Invention of a range in terms of at "'x' parts by weight of the resulting composition" also contemplates a teaching of ranges of same recited amount of "x" in percent by weight of the resulting composition. Relative proportions derivable by comparing relative parts or percentages are also within the teachings, even if not expressly recited.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps disclosed herein also contemplates embodiments that consist essentially of, or even consist partially of, the elements, ingredients, components or steps.

Plural elements, ingredients, components or steps can be provided by a single integrated element, ingredient, component or step. Alternatively, a single integrated element, ingredient, component, or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A plant fertilizer comprising a combination of:
    skimmate, wherein the skimmate has a sodium concentration of less than 1500 mg/L and comprises at least 47% of the plant fertilizer by volume, and wherein the skimmate comprises live bacteria;
    a source of potassium comprising *Ascophyllum nodosum*, wherein the *Ascophyllum nodosum* comprises at least 10 g/L of the plant fertilizer;
    a source of silicon;

a pH reducing agent, wherein the pH reducing agent comprises at least 0.25% by volume of the plant fertilizer;

a root growth enhancer comprising at least one microorganism;

a source of phosphorus and nitrogen comprising hydrolyzed fish scraps and Chilean nitrate, wherein the hydrolyzed fish scraps and Chilean nitrate comprise at least about 25% by volume of the plant fertilizer;

wherein the plant fertilizer does not comprise urea; and wherein the plant fertilizer is provided as a concentrate.

2. The plant fertilizer of claim 1, further comprising water.

3. The plant fertilizer of claim 2, wherein the water comprises deionized and/or reverse osmosis water.

4. The plant fertilizer of claim 2, wherein the plant fertilizer comprises at least 25% water by volume of the plant fertilizer.

5. The plant fertilizer of claim 1, wherein the plant fertilizer comprises at least 0.05% of the source of silicon by volume of the plant fertilizer.

6. The plant fertilizer of claim 1, wherein the pH reducing agent comprises an organic acid.

7. The plant fertilizer of claim 1, further comprising a gelling agent.

8. The plant fertilizer of claim 7, wherein the plant fertilizer comprises 5-10 g/L of the gelling agent.

9. The plant fertilizer of claim 1, further comprising a rooting hormone.

10. The plant fertilizer of claim 9, wherein the plant fertilizer comprises 0.1-0.5 g/L of the rooting hormone.

11. The plant fertilizer of claim 1, further comprising a fungicide.

12. The plant fertilizer of claim 11, wherein the plant fertilizer comprises 0.1-0.5 g/L of the fungicide.

13. The plant fertilizer of claim 1, further comprising a smell masking agent, wherein the smell masking agent is peppermint oil.

14. The plant fertilizer of claim 13, wherein the plant fertilizer comprises 0.1-0.4% smell masking agent by volume of the plant fertilizer.

15. The plant fertilizer of claim 1, further comprising a moisture adding agent.

16. The plant fertilizer of claim 15, wherein the plant fertilizer comprises 1-4% moisture adding agent by volume of the plant fertilizer.

* * * * *